US012433818B2

(12) United States Patent
Wang

(10) Patent No.: US 12,433,818 B2
(45) Date of Patent: Oct. 7, 2025

(54) MASSAGE DEVICE

(71) Applicants: Dongguan Mimao Electronic Technology Co., Ltd., Guangdong (CN); Shenzhen Zhonghongtian Technology Co., Ltd., Shenzhen (CN)

(72) Inventor: Qinling Wang, Guangdong (CN)

(73) Assignees: Dongguan Mimao Electronic Technology Co., Ltd., Dongguan (CN); Shenzhen Zhonghongtian Technology Co., Ltd., Shenzhen (CN)

(*) Notice: Subject to any disclaimer, the term of this patent is extended or adjusted under 35 U.S.C. 154(b) by 0 days.

(21) Appl. No.: 18/940,778

(22) Filed: Nov. 7, 2024

(65) Prior Publication Data

US 2025/0161149 A1 May 22, 2025

Related U.S. Application Data

(63) Continuation-in-part of application No. 18/746,012, filed on Jun. 17, 2024, which is a continuation-in-part (Continued)

(51) Int. Cl.

*A61H 19/00* (2006.01)
*A61H 7/00* (2006.01)
*A61H 23/02* (2006.01)

(52) U.S. Cl.

CPC ............. *A61H 19/32* (2013.01); *A61H 7/007* (2013.01); *A61H 23/0254* (2013.01);

(Continued)

(58) Field of Classification Search

CPC ........ A61H 19/00; A61H 19/30; A61H 19/32; A61H 19/34; A61H 19/50; A61H 7/00;

(Continued)

(56) References Cited

U.S. PATENT DOCUMENTS 6,190,339 B1 2/2001 Imazaike et al.
11,369,545 B1 * 6/2022 He ......................... A61H 7/005

(Continued)

FOREIGN PATENT DOCUMENTS

CN 104352254 A 2/2015
CN 106344382 A 1/2017

(Continued)

OTHER PUBLICATIONS

Notice of Refusal Dated Dec. 17, 2024 for Corresponding Japan Application No. 2024-201869.

(Continued)

*Primary Examiner* — Colin W Stuart

(57) ABSTRACT

A massage device includes a shell, a first stimulation module and a second stimulation module. The shell includes a main body, a first massage portion extending from the main body, and at least two second massage portions arranged around the first massage portion. The first stimulation module is mounted in the shell and configured for driving the first massage portion to rotate and/or swing. The second stimulation module is mounted in the shell and configured for driving the at least two second massage portions to swing towards or away from the first massage portion.

17 Claims, 22 Drawing Sheets

Related U.S. Application Data of application No. 18/516,984, filed on Nov. 22, 2023, now Pat. No. 12,161,598.

(52) U.S. Cl.
CPC ................ *A61H 2201/1215* (2013.01); *A61H 2201/1676* (2013.01); *A61H 2205/082* (2013.01)

(58) Field of Classification Search
CPC ........ A61H 7/001; A61H 7/002; A61H 7/003; A61H 7/004; A61H 7/005; A61H 7/007; A61H 7/008; A61H 23/00; A61H 23/02; A61H 23/0254; A61H 2201/1215; A61H 2201/1472; A61H 2201/1427; A61H 2201/1481; A61H 2201/149; A61H 2201/1661; A61H 2201/1666; A61H 2201/1671; A61H 2201/1673; A61H 2201/1676; A61H 2205/082; A61H 2205/087
USPC ............................................................ 600/38
See application file for complete search history.

(56) References Cited

U.S. PATENT DOCUMENTS

| | | | | |
|---|---|---|---|---|
| 11,554,073 | B1 * | 1/2023 | Guo | A61H 7/005 |
| 11,806,306 | B1 * | 11/2023 | Guo | A61H 7/007 |
| 2015/0065792 | A1 | 3/2015 | Levine | |
| 2019/0209359 | A1 | 7/2019 | Trost et al. | |
| 2019/0240109 | A1 | 8/2019 | Barkay | |
| 2020/0368103 | A1 | 11/2020 | Rakshit | |
| 2022/0096320 | A1 | 3/2022 | Lu | |
| 2024/0238155 | A1 * | 7/2024 | Huang | A61H 23/0254 |
| 2024/0252383 | A1 * | 8/2024 | Liufu | A61H 23/0263 |
| 2024/0252384 | A1 * | 8/2024 | Zhou | A61H 7/005 |

FOREIGN PATENT DOCUMENTS

| | | | |
|---|---|---|---|
| CN | 107551410 | A | 1/2018 |
| CN | 210872865 | U | 6/2020 |
| CN | 211584149 | U | 9/2020 |
| JP | 2010125335 | A | 6/2010 |
| JP | 2020081721 | A | 6/2020 |
| KR | 101310270 | B1 | 9/2013 |
| WO | 2014096476 | A1 | 6/2014 |
| WO | 2023194974 | A1 | 10/2023 |

OTHER PUBLICATIONS

Notice of Refusal Dated Jan. 28, 2025 for Corresponding Japan Application No. 2024-203424.
Notice of Refusal Dated Feb. 18, 2025 for Corresponding Japan Application No. 2024-202360.
Written Opinion of the International Searching Authority Dated Mar. 19, 2025 for Corresponding PCT Application PCT/CN2024/134000.
International Search Report Dated Mar. 19, 2025 for Corresponding PCT Application PCT/CN2024/134000.
Office Action Dated Apr. 10, 2025 for Corresponding European Patent Application No. 24214864.1.
The Extended European Search Report Dated Aug. 12, 2025 for Corresponding European Patent Application No. 24214864.1.

* cited by examiner

MASSAGE DEVICE

CROSS-REFERENCE TO RELATED APPLICATIONS

This application is a continuation in part application of application Ser. No. 18/746,012 filed on Jun. 17, 2024, which is a continuation in part application of application Ser. No. 18/516,984, filed on Nov. 22, 2023, the entire contents of which are hereby incorporated by reference.

TECHNICAL FIELD

The present application relates to the technical field of health massage devices, and in particular to a massage device.

BACKGROUND

In recent years, various massage devices have been developed to help users release stress and relax their body and mind. Generally, an existing massage device uses vibration motor(s) to provide high-frequency vibration to stimulate the user's body, particularly sensitive areas of the body, such as the breast, the genitalia and the like, which has poor stimulation effect and thus is difficult to meet users' needs.

SUMMARY

An object of the present application is to provide a massage device which can provide better stimulation effect.

In order to achieve the above object, an embodiment of the present application provides a massage device, including:

- a shell including a main body, a first massage portion extending from the main body, and at least two second massage portions arranged around the first massage portion;
- a first stimulation module mounted in the shell and configured for driving the first massage portion to rotate and/or swing; and
- a second stimulation module mounted in the shell and configured for driving the at least two second massage portions to swing towards or away from the first massage portion.

Compared with the prior art, the massage device according to an embodiment of this application includes at least two second massage portions swinging towards or away from the first massage portion to knead the human body between the second massage portions, and at the same time the first massage portion is driven to swing or rotate to stimulate the human body, thereby providing better stimulation effects to the user.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIG. 1 to FIG. 7, a massage device according an embodiment of the present application is shown. In this embodiment, the massage device 100 includes a shell 20 and a stimulation assembly mounted in the shell 20.

Figure 1:
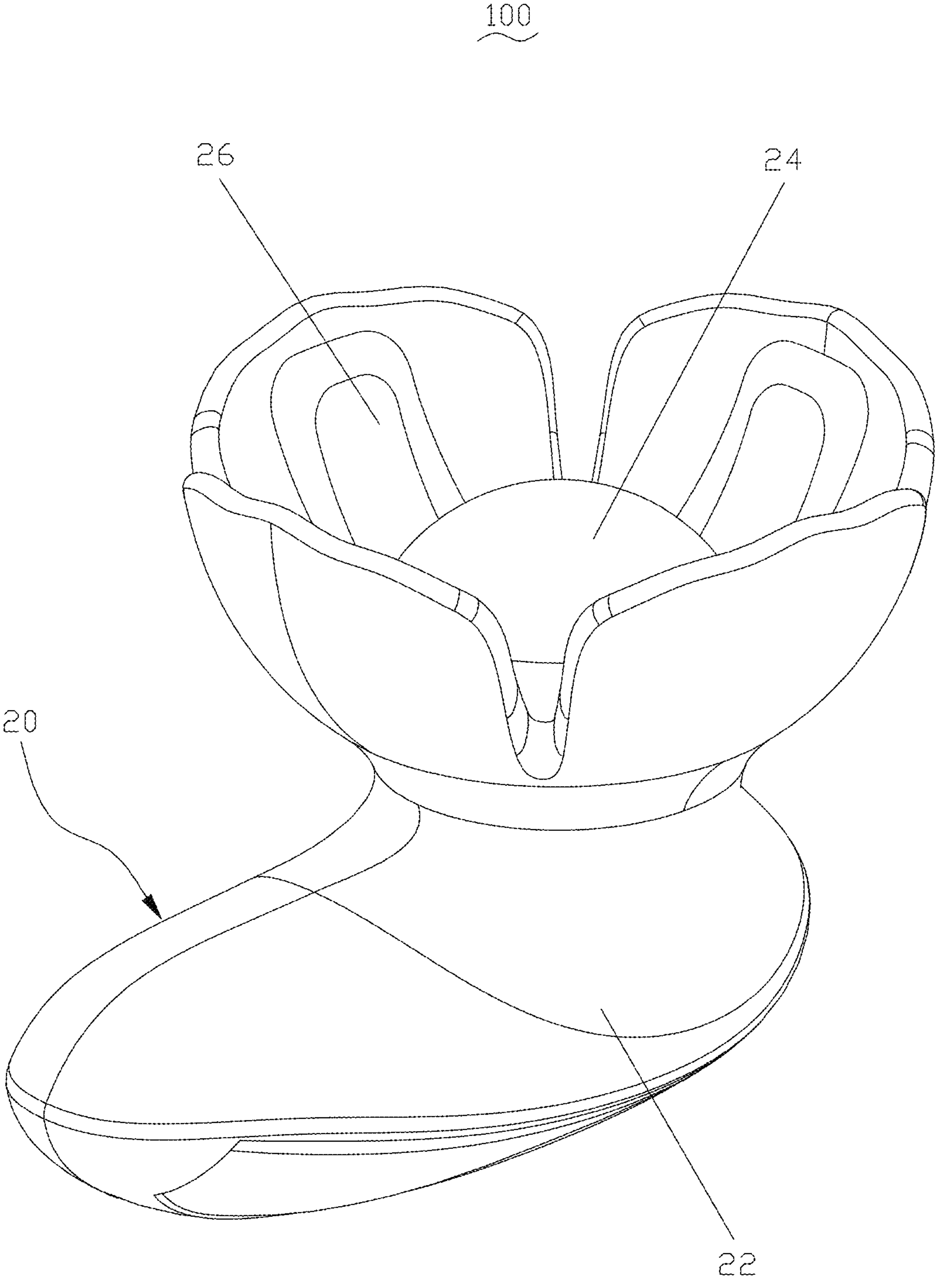
FIG. 1 is an isometric, assembled view of a massage device according to a first embodiment of the present application.
Figure 2:
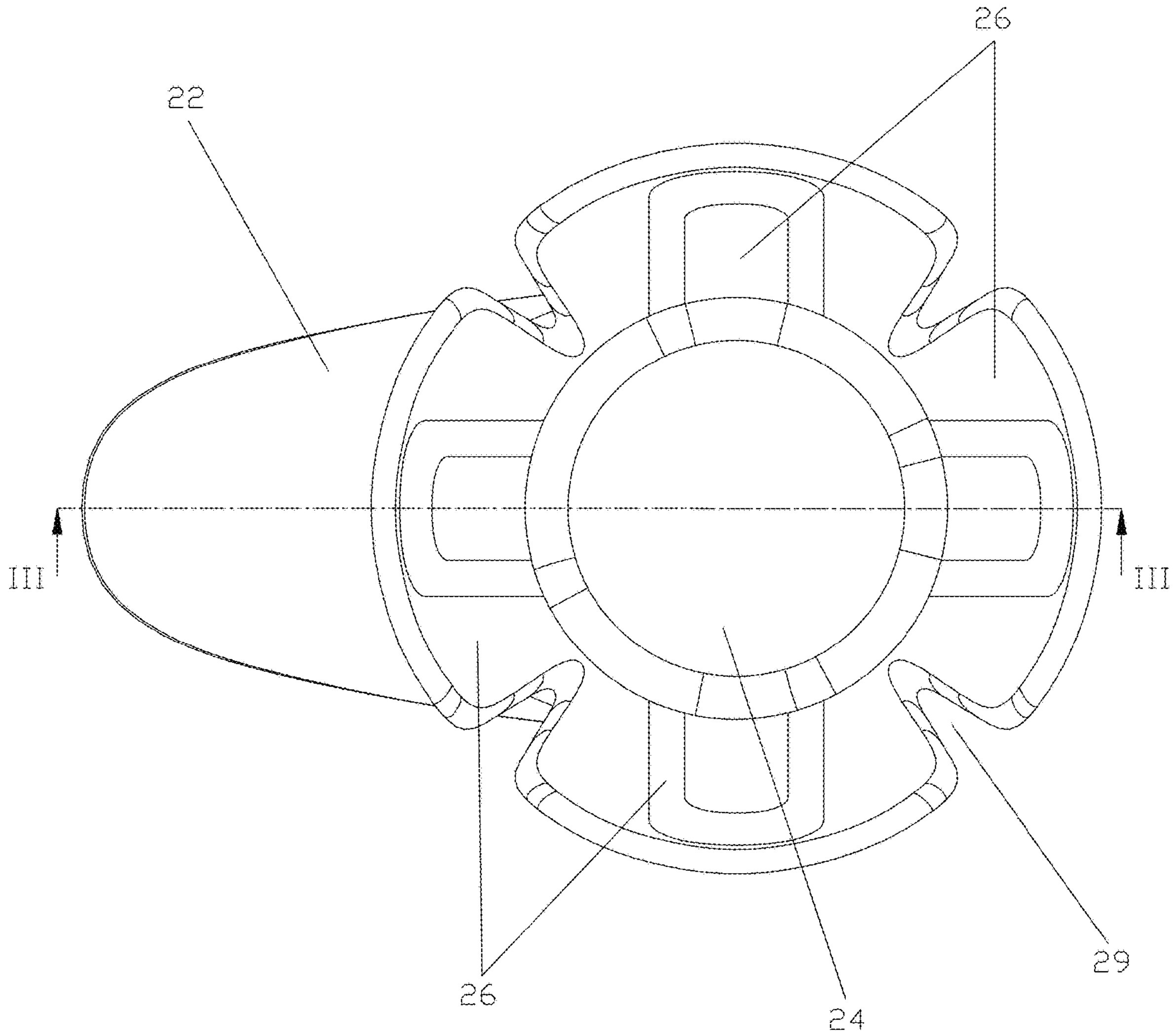
FIG. 2 is a top plan view of the massage device of FIG. 1.
Figure 3:
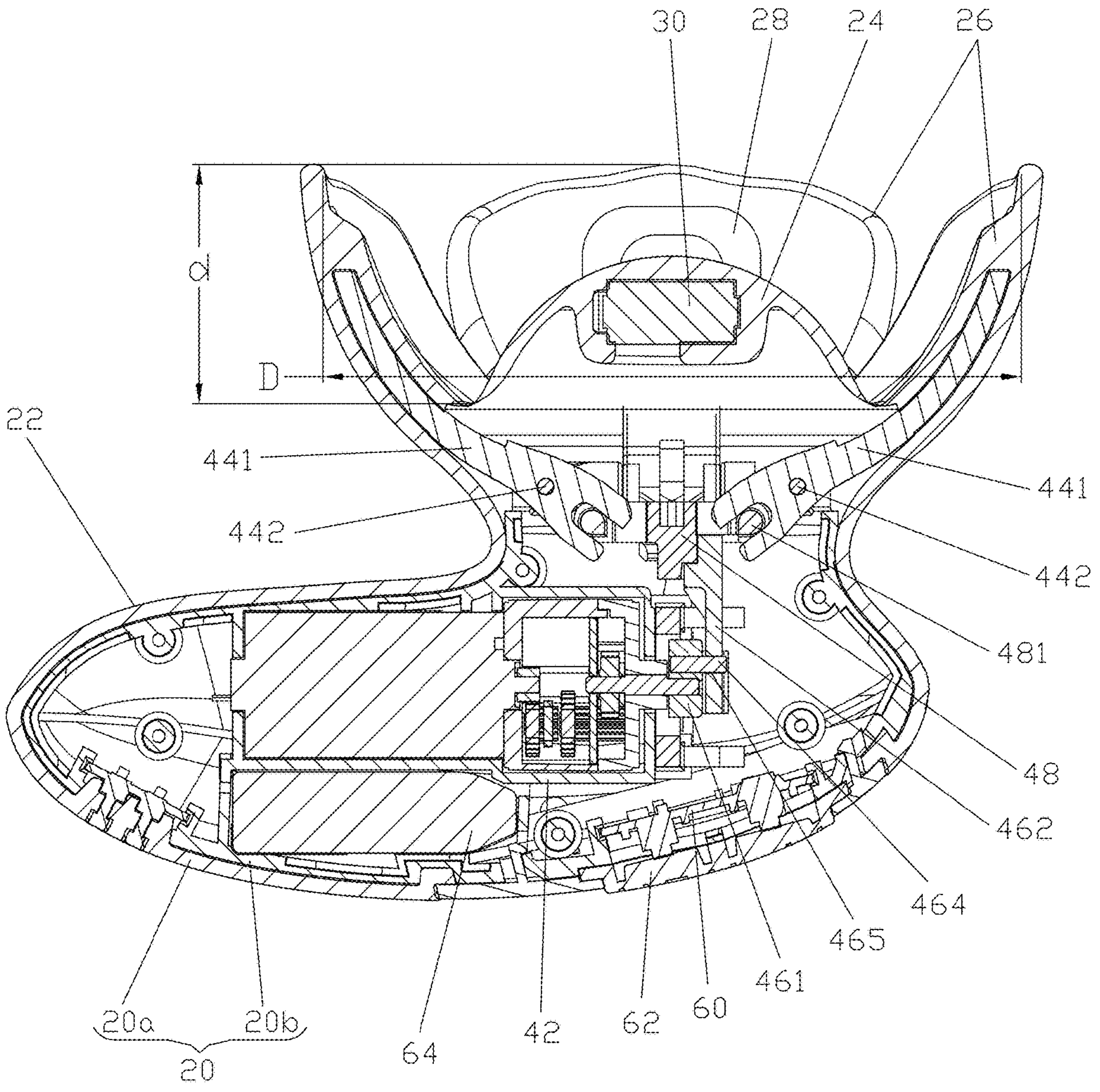
FIG. 3 is a cross sectional view of the massage device taken along line III-III of FIG. 2.
Figure 4:
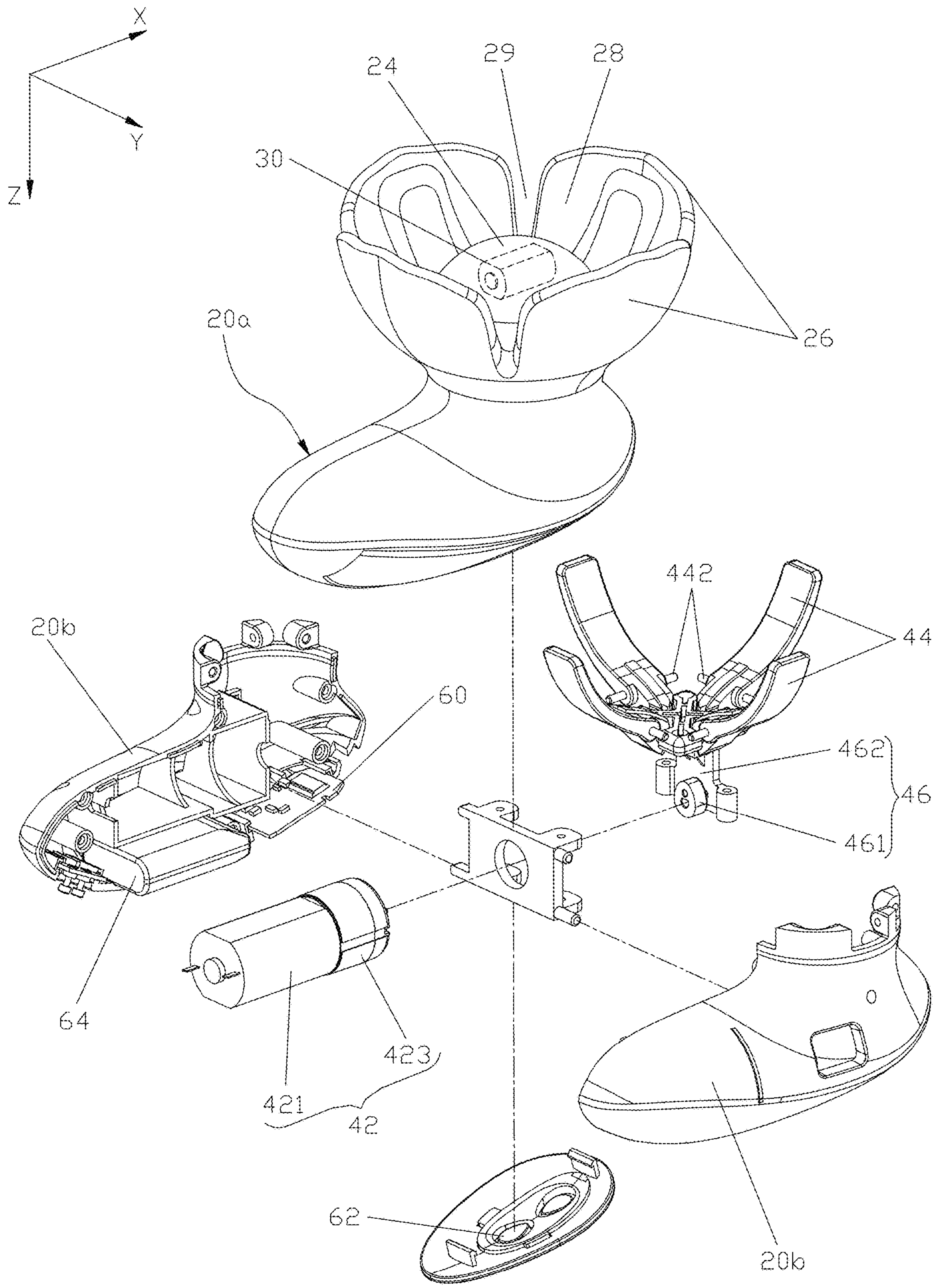
FIG. 4 is an exploded view of the massage device of FIG. 1.

As shown in FIG. 3 and FIG. 4, the shell 20, preferably, is a double-layer structure, and includes an outer shell 20*a* and an inner shell 20*b* being integrally fixed inside the outer shell 20*a*. The inner shell 20*b* may be made of hard materials, such as plastic, metal and etc., which has a relatively high strength and thus provides support for the stimulation modules 30, 40 mounted inside the shell 20. The outer shell 20*a* may be made of flexible materials, such as silicone, rubber and etc., for directly contacting a part of the human body which needs to be stimulated, so that the present massage device 100 in whole has high strength and comfortable use experience.

In a specific embodiment, firstly, the inner shell 20*b* is assembled with components to be installed inside the shell 20, such as the stimulation assembly and etc.; and then, the outer shell 20*a* is formed around the inner shell 20*b* through over-molding, achieving good sealing effect for the components inside the shell 20. The outer shell 20*a* is integral and play a waterproof and dustproof role, facilitating cleaning and storage of the massage device 100.

In this embodiment, the shell 20 includes a main portion 22, a first massage portion 24 and a plurality of second massage portions 26. The main portion 22 is configured as a double-layer structure, providing support for the stimulation assembly and etc. The second massage portions 26 extend integrally and outwardly from the outer shell 20*a* of the main portion 22, and the first massage portion 24 is surrounded by and connected to inner ends of the second massage portions 26 integrally. A chamber 28 is formed among the second massage portions 26 for accommodating a part of the human body (such as the breasts) that needs to be stimulated therein. Preferably, the chamber 28 has a size decreased gradually and inwardly. That is, the chamber 28 has the maximum size at its open side.

In this embodiment, the first massage portion 24 is dome-like, and the second massage portion 26 is sheet-like. In whole, the first and second massage portions 24, 26 are configured like a flower, wherein the first massage portion 24 is configured as a flower core, and the second massage portions 26 are configured as flowers petals. Outer ends of the second massage portions 26 extend slightly away from each other, and thus the chamber 28 is generally bowl-shaped, which can fit the shape of the breasts of the human body better. Specifically, a depth "d" of the chamber 28 may be 3-300 mm, and the diameter "D" of the chamber 28 at its open side may be 10-200 mm.

In this embodiment, the second massage portions 26 are set evenly along a circumferential direction, and symmetrical relative to the first massage portion 24. Specifically, the second massage portions 26 are spaced from each other in the circumferential direction, and a gap 29 is defined between each two neighboring second massage portions 26. Thus, the second massage portions 26 will not interfere with each other during operation. Accordingly, swinging amplitude of the second massage portions 26 may be greater and stimulation to the human body may be stronger. It should be understood that the second massage portions 26 may be set unsymmetrically, and/or, may be formed with different sizes or shapes.

In this embodiment, the first massage portion 24 of the shell 20 is configured as a vibration portion, and the second massage portions 26 of the shell 20 are configured as swinging portions. That is, the shell 20 is configured with two different massage portions for generating two different kinds of motions. Correspondingly, the stimulation assembly includes a first stimulation module 30 configured for driving the first massage portion 24 to vibrate and a second stimulation module 40 configured for driving the second massage portions 26 to swing relative to the first massage portion 24.

As shown in FIG. 3 and FIG. 4, the first stimulation module 30 includes at least one vibration motor, which is embedded in the first massage portion 24 of the shell 20 for generating high-frequency vibration to the part of the human body accommodated inside the chamber 28. When the present the massage device 100 is used to stimulate the breasts, the vibration motor 30 drives the first massage portion 24 to stimulate the nipples, obtaining a better stimulation effect.

Figure 5:
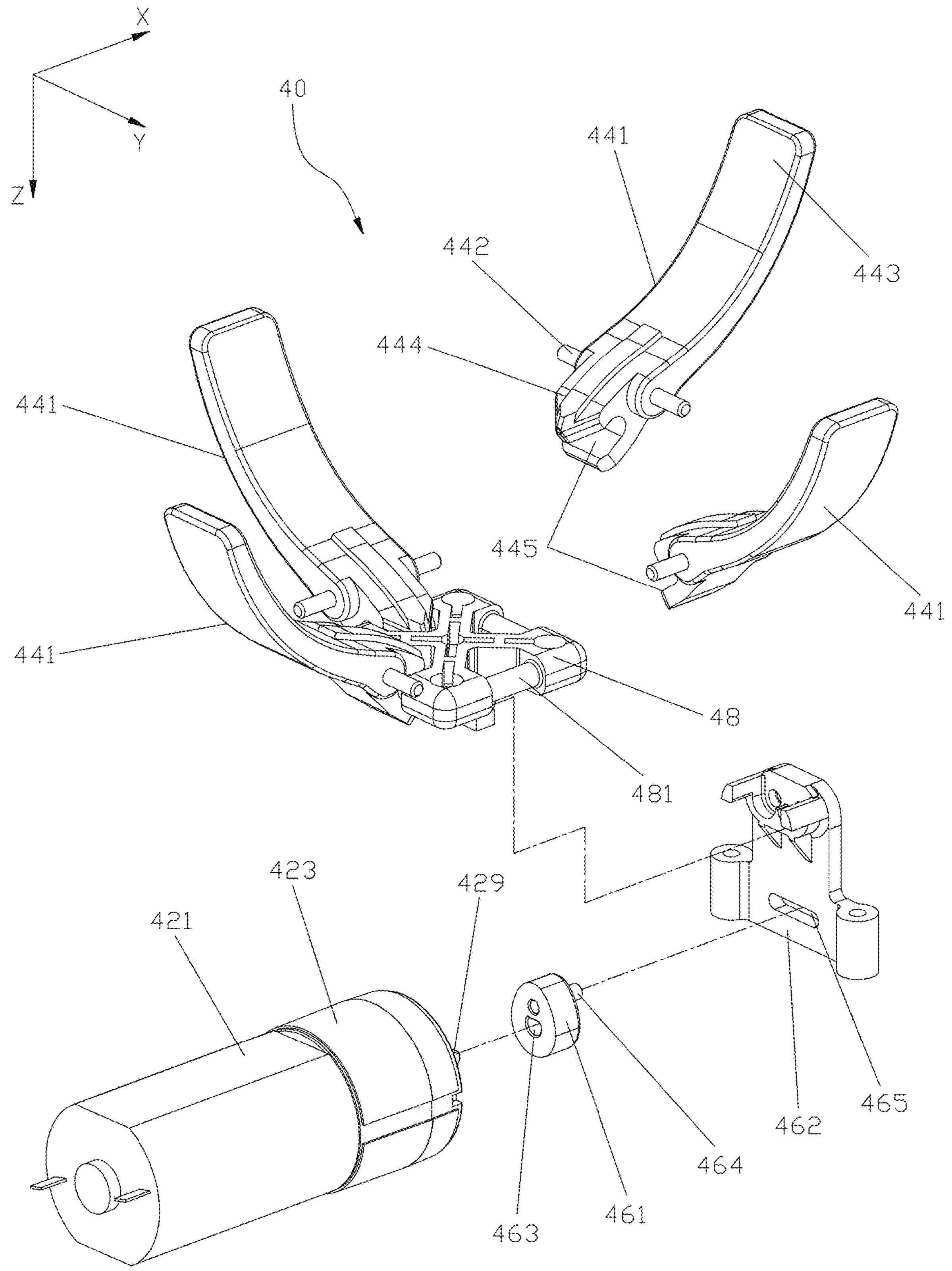
FIG. 5 is a further exploded view of a second stimulation module of the massage device of FIG. 1.
Figure 6:
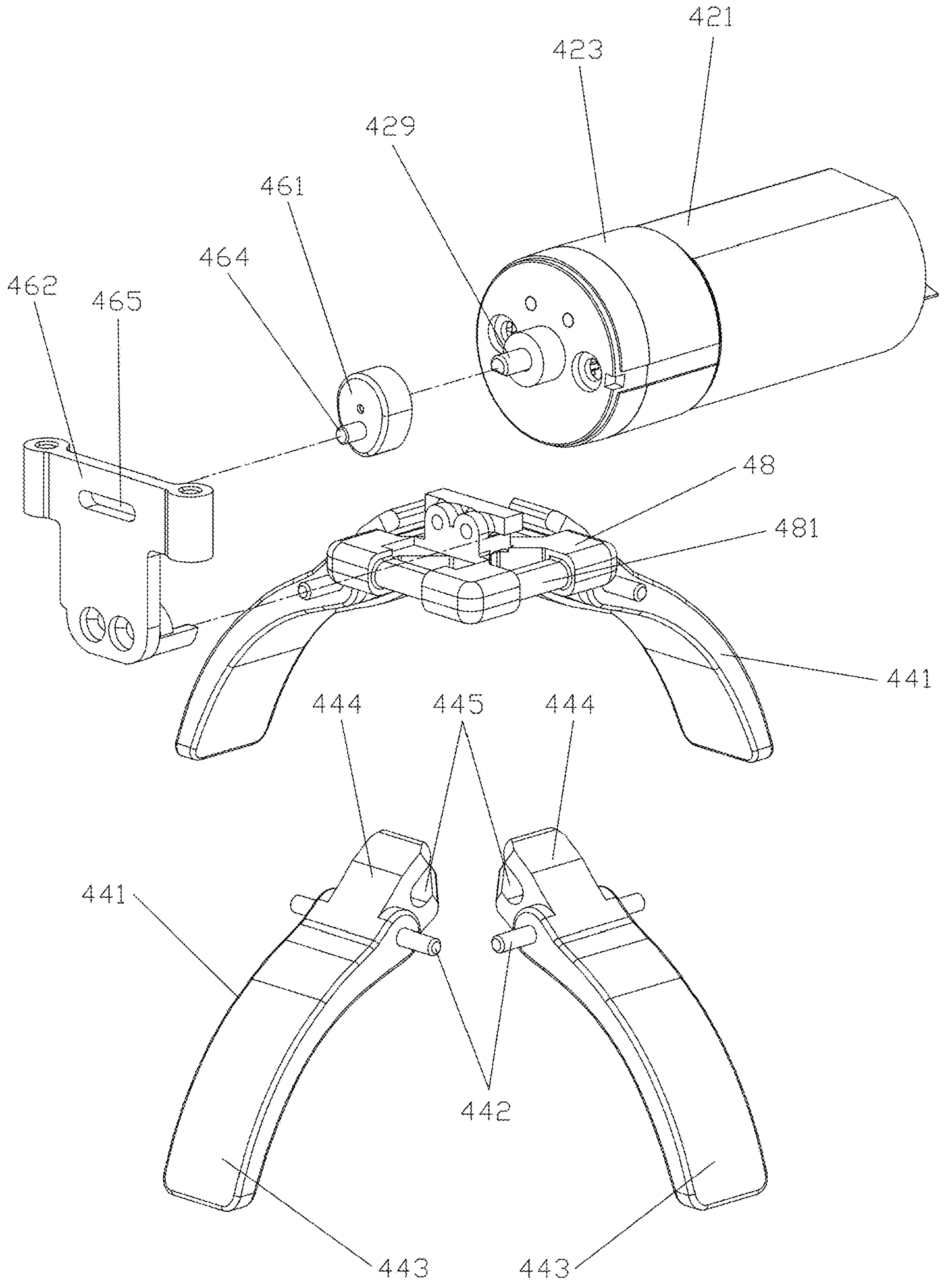
FIG. 6 is an exploded view of the second stimulation module of FIG. 5 viewed from another aspect.

As shown in FIG. 5 and FIG. 6, the second stimulation module 40 includes a gearbox 42, a swinging unit 44, and a transmission unit 46 connected between the gearbox 42 and the swinging unit 44.

Figure 7:
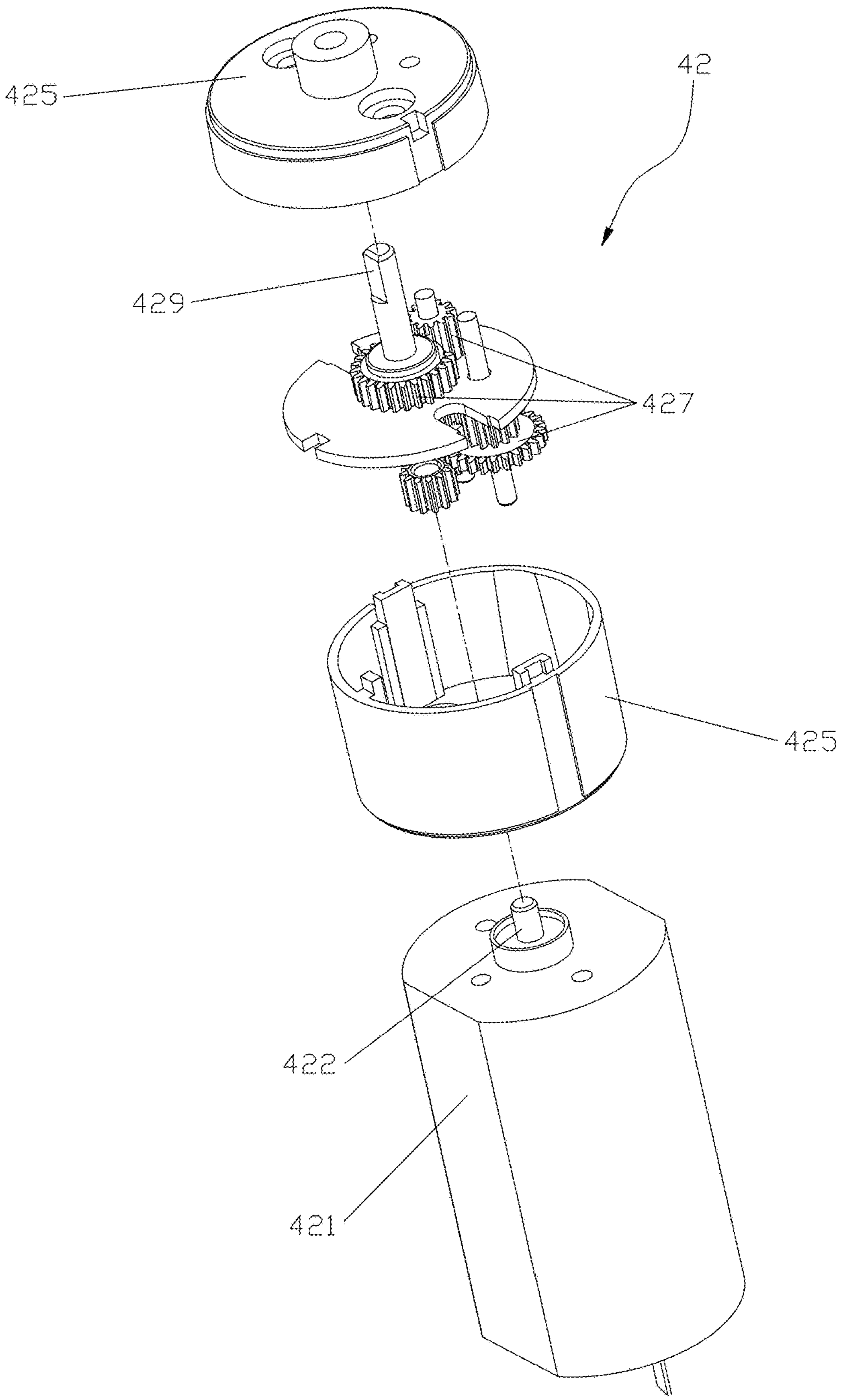
FIG. 7 is a further exploded view of a gearbox of the second stimulation module of FIG. 5.

Referring to FIG. 7, the gearbox 42 includes a rotary motor 421 and a reduction gear unit 423 connected to the rotary motor 421. The rotary motor 421 serves as a driving component of the second stimulation module 40 and has an output shaft 422 rotating at high-speed. The reduction gear unit 423 includes a gear housing 425 and a plurality of gears 427 arranged in the gear housing 425. The gears 427 mesh with each other, and a reduction ratio of the whole gearbox 42 can be determined according to the gear ratios between the meshed gears 427 of the reduction gear unit 423. In an embodiment, the reduction ratio of the gearbox 42 is not less than 4:1 and not more than 100:1.

The reduction gear unit 423 has an output shaft 429, wherein the output shaft 429 serves as an output shaft of the gearbox 42. Under the reduction effect of the reduction gear unit 423, a speed of the output shaft 429 does not exceed 1000 rpm.

The transmission unit 46 is configured for converting rotation of output shaft 429 of the gearbox 42 into reciprocating linear movement. In this embodiment, the transmission unit 46 includes an eccentric wheel 461 and a sliding member 462.

The eccentric wheel 461 is connected to the output shaft 429 at a central portion thereof. In this embodiment, the eccentric wheel 461 defines a central hole 463 for inserting of the output shaft 429 therein. The central hole 463 is non-circular shaped, such as D-shaped, and a cross section of the output shaft 429 has a shape matching with that of the central hole 463. After inserting of the output shaft 429 into the central hole 463, a relative rotation therebetween is limited for shape fitting, thereby the eccentric wheel 461 can rotate along with the output shaft 429 of the gearbox 42.

An eccentric rod 464 is set eccentrically on the eccentric wheel 461 and extends towards the sliding member 462. Generally, the eccentric rod 464 is parallel to the output shaft 429 of the gearbox 42. In this embodiment, as shown in FIG. 5, the eccentric rod 464 and the output shaft 429 both extends along X-direction. During rotation of the eccentric wheel 461 along with the output shaft 429, the eccentric rod 464 revolves round the output shaft 429 in YZ plane. In other words, under the driving of the gearbox 34, the eccentric rod 464 generates displacements in both Y-direction and Z-direction.

The sliding member 462 defines a sliding groove 465 therein, which is generally strip-shaped and elongated in a direction perpendicular to the eccentric rod 464, such as the Y-direction. The eccentric rod 464 engages into the sliding groove 465, and is fixed relative to the sliding member 462 in the Z-direction whilst is slidable relative to the sliding member 462 in the Y-direction. During revolving of the eccentric rod 464 round the output shaft 429, its displacement in the Y-direction makes it slide relative to the sliding member 462 along the sliding groove 465, while its displacement in the Z-direction drives the sliding member 462 to move along with it in the Z-direction.

By means of the cooperation of the eccentric rod 464 of the eccentric wheel 461 and the sliding groove 465 of the sliding member 462, rotation of the gearbox 42 is converted into reciprocating linear motion of the sliding member 462 in the Z-direction.

The swinging unit 44 includes multiple swinging bars 441 arranged around the sliding member 462. Each of the swinging bars 441 is rotatably connected to the shell 20, preferably the inner shell 20*b*, by a first pivot 442. In this embodiment, the swinging bar 441 is generally sheet-like and elongated in the Z-direction. One end of the swinging bar 441, preferably an end away from the first pivot 442, is configured as a swinging end 443 and extends into one of the second massage portions 26 of the shell 20; and, another end of the swinging bar 441, preferably an end adjacent to the first pivot 442, is configured as a connecting end 444 and connected to the sliding member 462.

The first pivots 442 extend perpendicular to the Z-direction, wherein some of the first pivots 442 extend along the X-direction, and some of the first pivots 442 extend along the Y-direction. When the sliding member 462 moves in the Z-direction, the swinging bars 441 are driven to swing about the first pivots 442, respectively. That is, the swinging bars 441 swing in the XZ plane or YZ-plane. The swinging ends 443 of all of the swinging bars 441 swing towards or away from each other synchronously, achieving an occlusion action to knead the part of the human body entering the chamber 28 and covered by the swinging bars 441.

Further, a sliding frame 48 is provided inside the shell 20 for rotatably connecting the swinging bars 441 to the sliding member 462. In this embodiment, the sliding frame 48 is generally constructed as a polygon structure with a number of lateral edges the same as the number of the swinging bars 441/second massage portions 26. The connecting end 444 of each swinging bar 441 is rotataly connected to a lateral edge of the sliding frame 48 by a second pivot 481. Each second pivot 481 is set to be generally parallel to a corresponding first pivot 442 for the same swinging bar 441.

The sliding frame 48 may be formed separately and then assembled to the sliding member 462, or, may be integrally formed with the sliding member 462 as one piece, as long as the sliding frame 48 can move together with the sliding member 462. In this embodiment, the second pivot 481 is integrally formed with the sliding frame 48 as one piece, and a U-shaped groove 445 is defined in the connecting end 444 of the swinging bar 441 for facilitating assembly of the second pivot 481 and the swinging bar 441. It should be understood that, in other embodiment, the second pivot 481 may be formed separately and then assembly to the sliding frame 48 and/or swinging bar 441.

In this embodiment, as shown in FIG. 5, the sliding frame 48 is generally square-shaped, and four swinging bars 441 are provided to connect four lateral edges of the sliding frame 48, respectively. Correspondingly, the shell 20 includes four second massage portions 26 arranged around the first massage portion 24 for accommodating the swinging ends 443 of the four swinging bars 441 therein, respectively. It should be noted that the number of the second massage portions and/or swinging bars are not limited to be four as the above embodiment.

Figure 8:
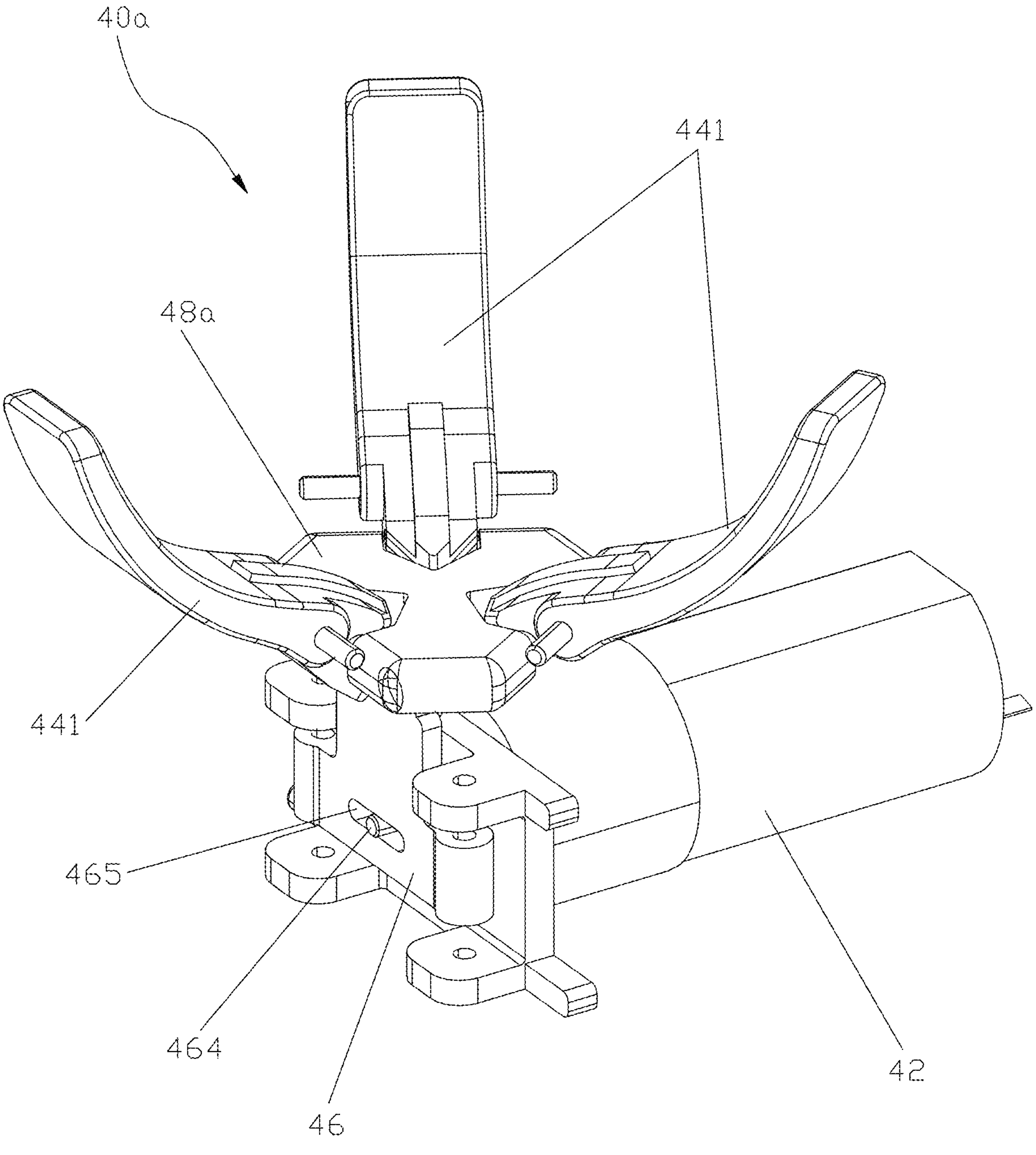
FIG. 8 is a schematic view of a second stimulation module of a massage device according to a second embodiment of the present application.

FIG. 8 shows a second stimulation module 40*a* of a massage device according to an alternative embodiment. In this embodiment, the second stimulation module 40*a* includes three swinging bars 441 connected to the transmission unit 46 by a sliding frame 48*a* which is generally hexagonal-shaped. Preferably, the massage device may have 3-8 swinging bars 441, such as five or six swinging bars 441. Correspondingly, there may be 3-8 second massage portions 26. The sliding frame 48 may be configured with a number of lateral edges the same or larger than that of the swinging bars 441/second massage portions 26.

During operation, the sliding member 462 and the sliding frame 48 move together in the Z-direction under the driving of the gearbox 42, and in turn drives the swinging bars 441 to swing about the first pivots 442 relative to the shell 20, and swing about the second pivots 481 relative to the sliding frame 48 at the same time, thereby the swinging ends 443 and the second massage portions 26 swinging towards or away from the first massage portion 24 to knead the human body, which is similar to a pinch motion of the human hand, providing a more comfortable sexual stimulation, and thus the users are more likely to reach orgasm with the help of the present massage device 100.

In this embodiment, the first pivot 442 is adjacent to the connecting end 444 and away from the swinging end 443 of the swinging bar 441, so that the swinging end 443 of the swinging bar 441 which rotates about the first pivot 442 can get a greater swing amplitude even if a swinging angle of the swinging bar 441 rotating about the second pivot 481 is small. Accordingly, the second massage portions 26 driven by the swinging bars 441 can provide an enhanced stimulation to the human body.

Referring to FIG. 3 and FIG. 4 again, a control circuit board 60 is mounted in the shell 20 and electrically connected to the rotary motor 421 and vibration motor 30 for controlling their operation according to user's instructions, such as controlling the vibration frequency of the vibration motor 30, controlling the rotary speed of the rotary motor 42, and etc. Control buttons 62, such as mechanical buttons or touch buttons, may be provided on the outer shell 20*a* for input the user's instructions. Further, a battery 64, preferably a rechargeable battery, is arranged in the main portion 22 of the shell 20 and electrically connected to electric components, such as the rotary motor 421, the vibration motor 30, and etc., through the control circuit board 60 for supplying electric power.

During operation, the second stimulation module 40 may be started separately to achieve a stimulation effect to the human body, such as the breasts, through swinging of the second massage portions 26; or, the first stimulation module 30 may be started separately to achieve a stimulation effect to the human body through the high-frequency vibration of the first massage portion 24; or, the first and second stimulation modules 30, 40 may be started at the same time to provide a multi-stimulation effect to the human body. For enhance user comfort, the second massage portions 26 and the first massage portion 24 of the shell 20 are constructed as a soft single-layer structure, i.e., without the hard inner shell 24.

For the above massage device 100, the chamber 28 is formed among several second massage portions 26 to accommodate a part of the human body, such as the breasts, and the second massage portions 26 swing towards or away from the first stimulation module 30 to pinch the part of the human body inside the chamber 28, which is more suitable for women, particularly for stimulating the breasts of the women. It should be understood that stimulating the breasts may not enhance the sexual experience during sexual life, but also play a role in treating breast diseases in healthcare. In addition, such massage device may also be used for man, such as stimulating the glans penis.

FIGS. 9-19 show a massage device according to a third embodiment of the present application. In this embodiment, the massage device 100*c* includes a shell 20*c* and a stimulation assembly mounted in the shell 20*c*.

Figure 9:
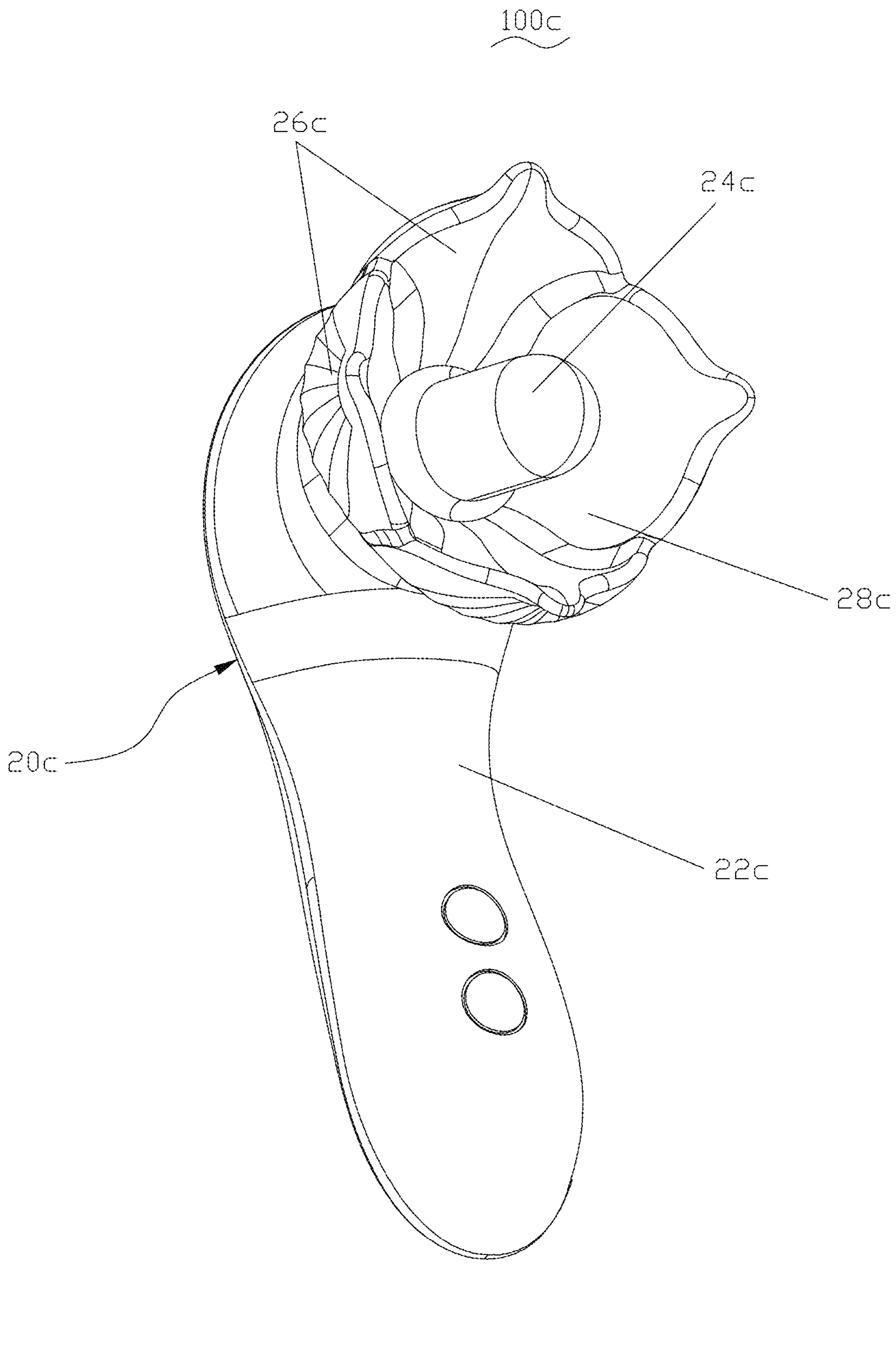
FIG. 9 is an isometric, assembled view of a massage device according to a third embodiment of the present application.
Figure 10:
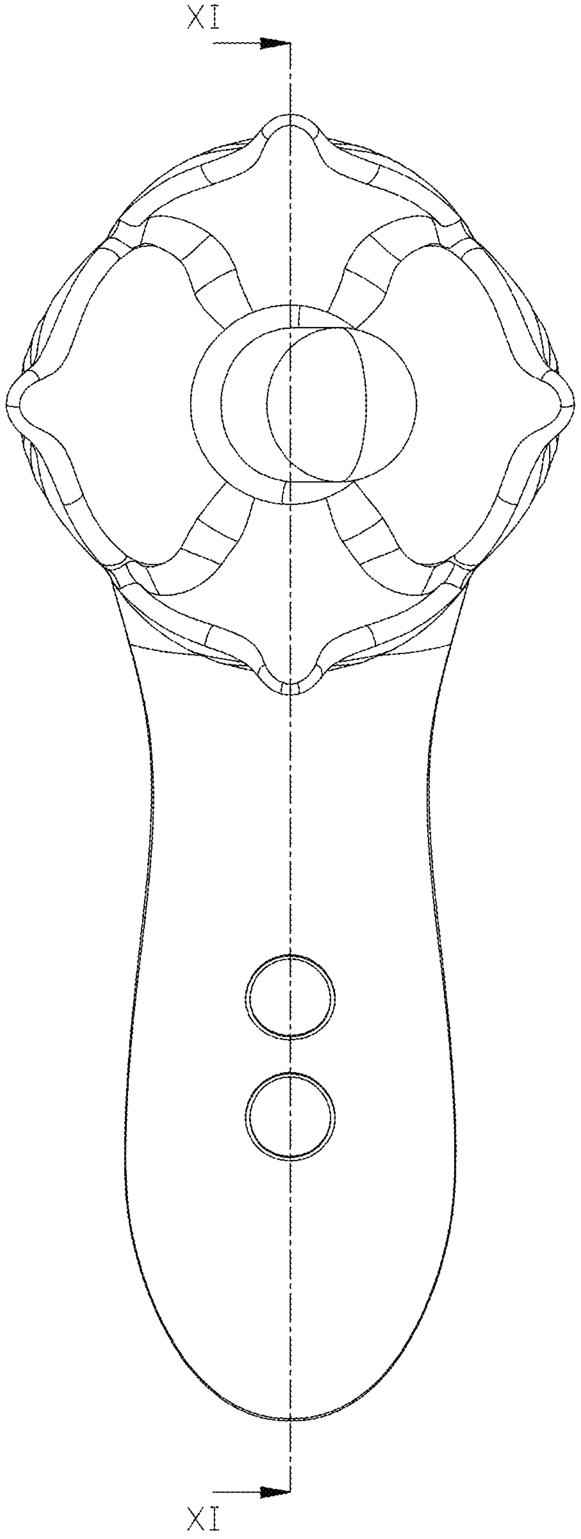
FIG. 10 is a top plan view of the massage device of FIG. 9.

As shown in FIG. 9, the shell 20*c* includes a main portion 22*c*, a first massage portion 24*c* and a plurality of second massage portions 26*c* arranged around the first massage portion 24*c*. Similar to the first embodiment, shell 20*c* is configured with two layers, i.e., an inner hard layer and an outer flexible layer, at the main portion 22*c*, and is configured with a single layer at the first massage portion 24*c* and the second massage portions 26*c*. Preferably, the first massage portion 24*c* and the second massage portions 26*c* are integrally formed with the outer flexible layer of the main portion 22*c*.

The first massage portion 24*c* is generally column-shaped with a distal end being configured like a dome, and each second massage portion 26*c* is curved and sheet-like. In this embodiment, neighboring second massage portions 26*c* are connected with each other, so that a chamber 28*c* formed among the second massage portions 26*c* is generally enclosed in the circumferential direction, which can better wrap around the breasts of the user during use. Preferably, a connecting position of two neighboring second massage portions 26*c* is generally V-shaped, facilitating the swinging of the second massage portions 26*c*.

Figure 11:
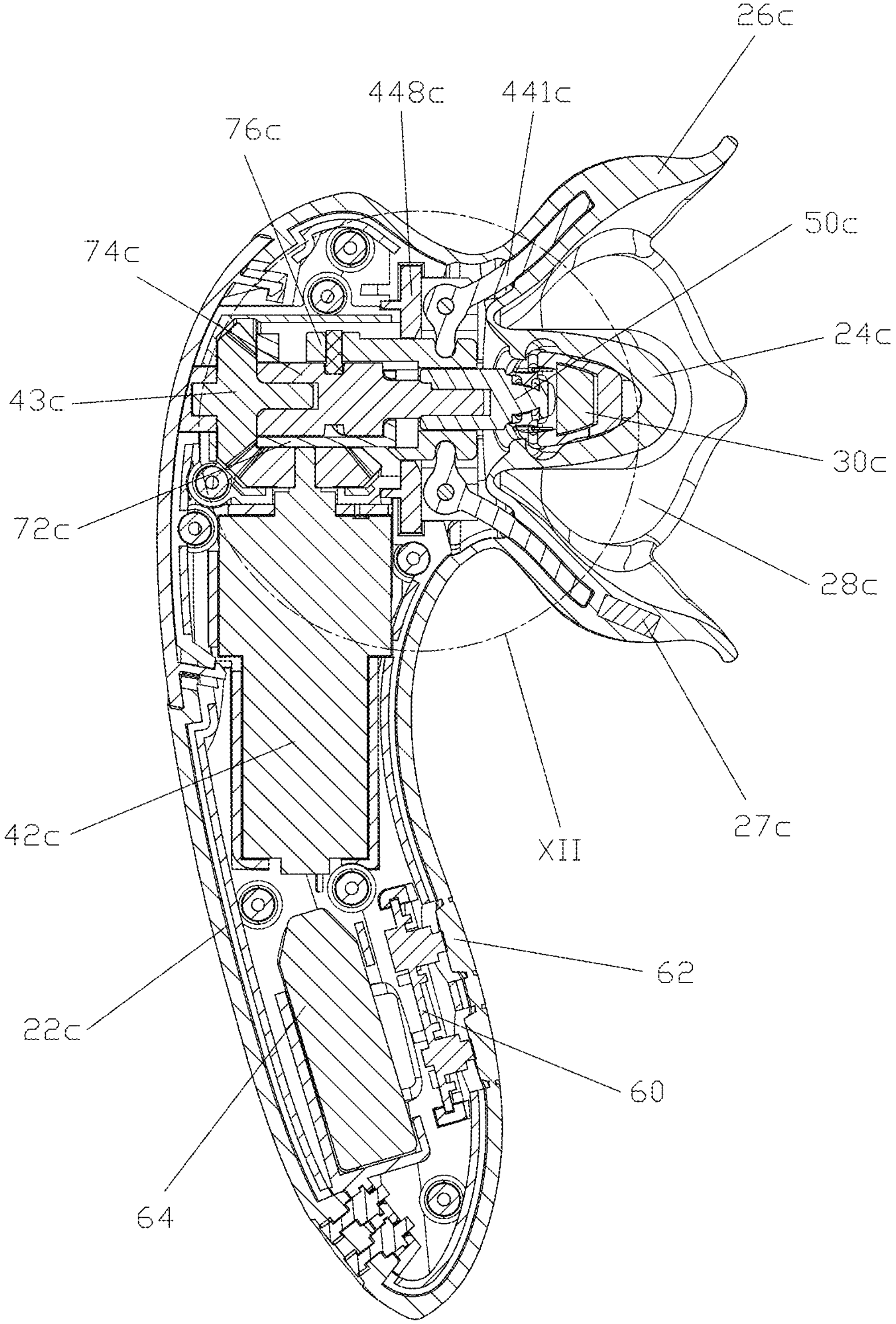
FIG. 11 is a cross sectional view of the massage device taken along line XI-XI of FIG. 10.
Figure 15:
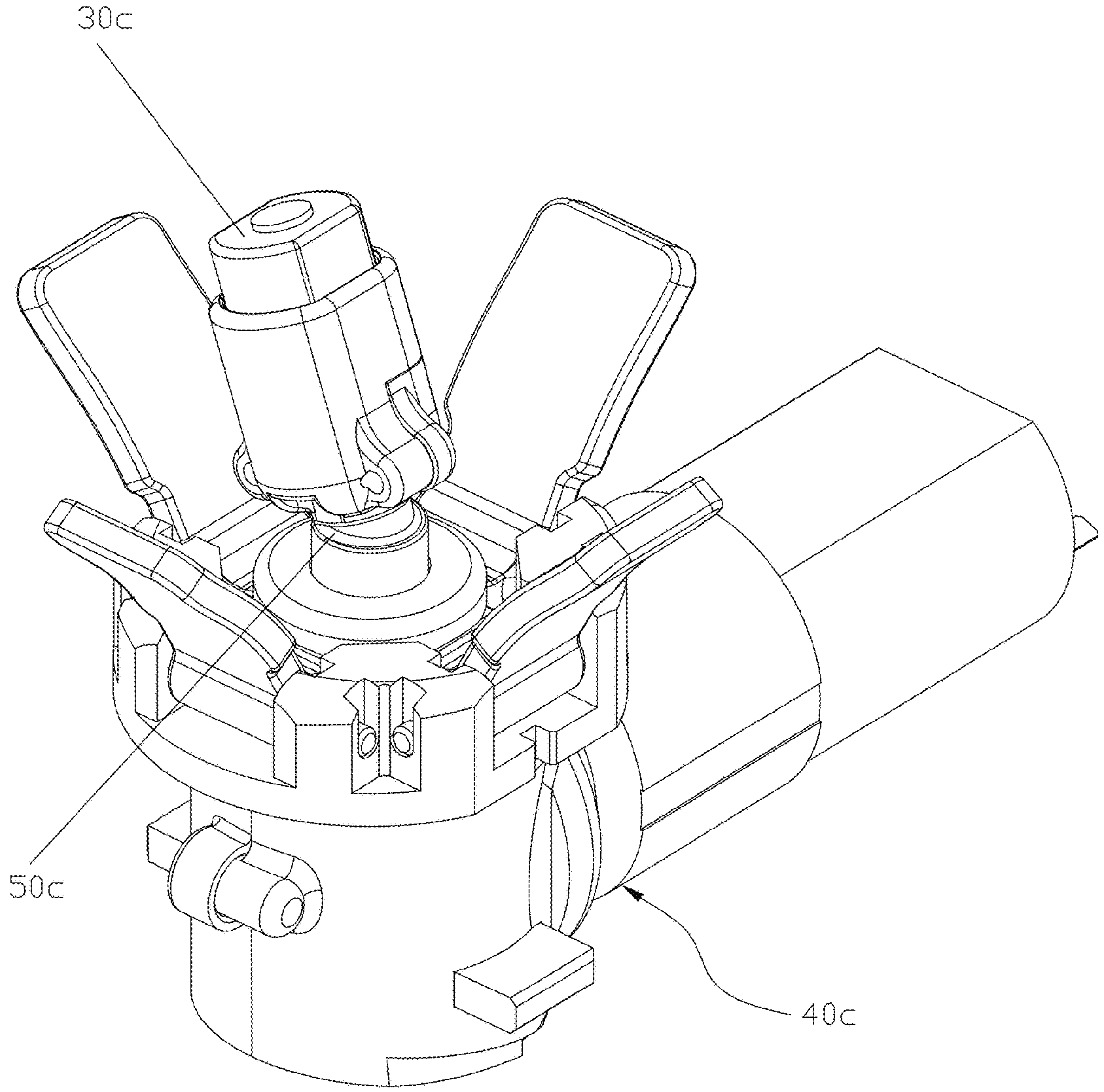
FIG. 15 is a schematic view of the stimulation assembly of the massage device of FIG. 9.

Referring to FIG. 11 and FIG. 15, the stimulation assembly includes a first stimulation module 30*c*, such as a vibration motor provided inside the first massage portion 24*c* of the shell 20*c* for driving the first massage portion 24*c* to vibrate; a second stimulation module 40*c* for driving the second massage portions 26*c* to swing towards or away from the first massage portion 24*c*; and a third stimulation module 50*c* for driving the first massage portion 24*c* to rotate.

Figure 16:
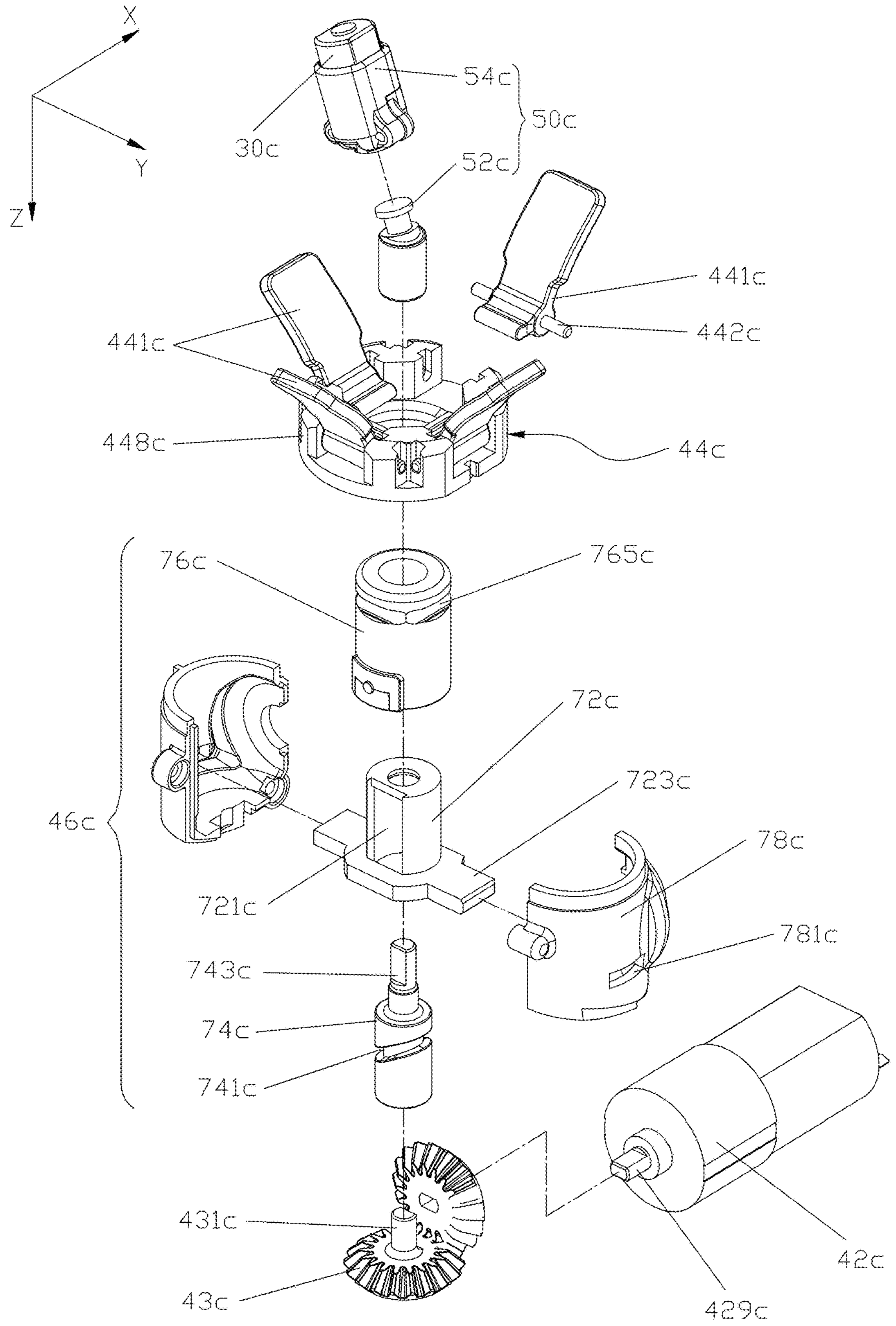
FIG. 16 is an exploded view of the stimulation assembly of FIG. 15.
Figure 17:
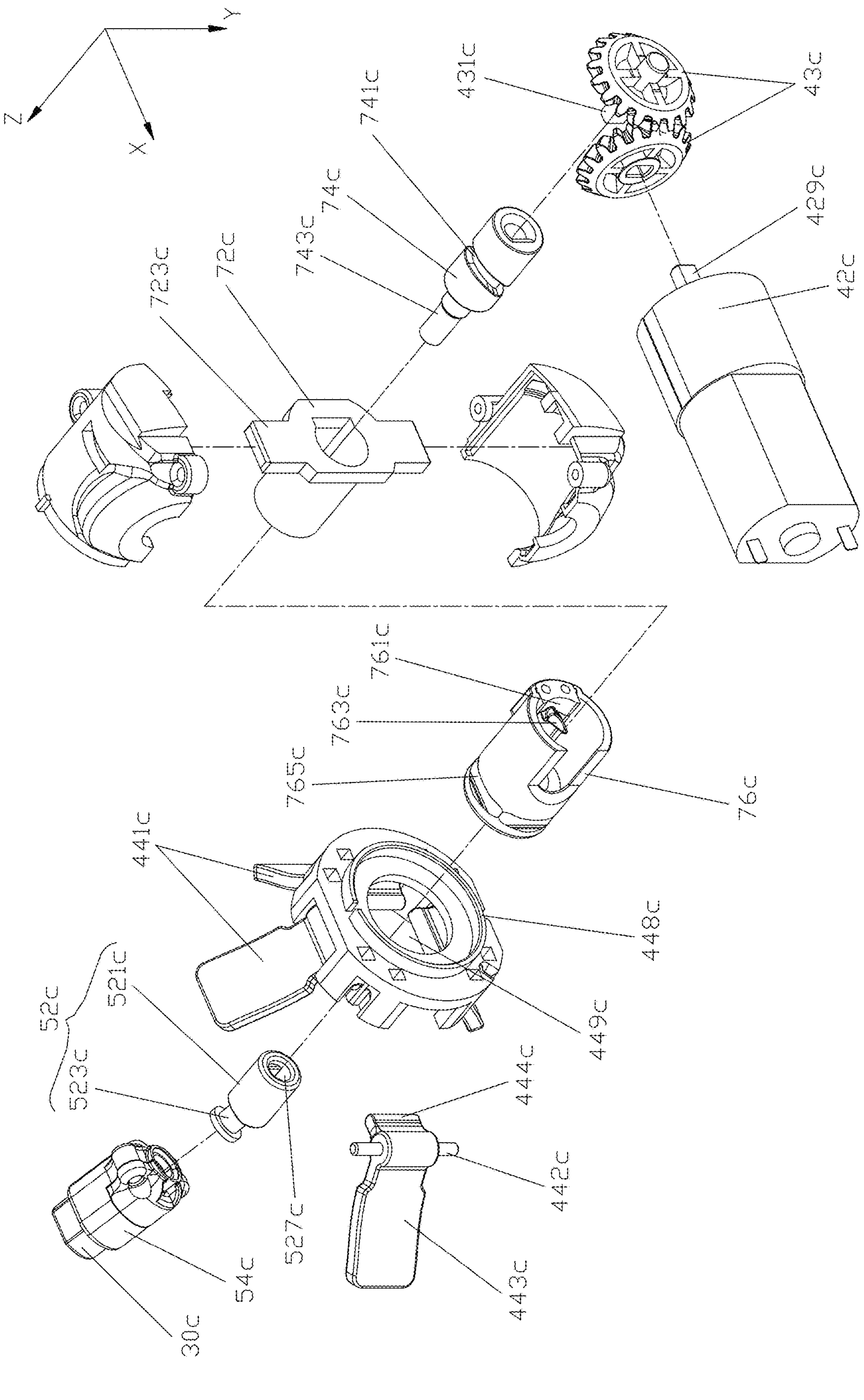
FIG. 17 is an exploded view of the stimulation assembly of FIG. 15 viewed from another aspect.

Referring also to FIG. 16 to FIG. 17, the second stimulation module 40*c* includes a gearbox 42*c*, a swinging unit 44*c*, and a transmission unit 46*c* connected between the gearbox 42*c* and the swinging unit 44*c*.

The transmission unit 46*c* is configured for converting rotation of the gearbox 42*c* into reciprocating linear movement. As shown in FIG. 16, the transmission unit 46*c* includes a fixed member 72*c*, a rotary member 74*c*, and a sliding member 76*c* that cooperate with each other, wherein the rotary member 74*c* is connected to an output shaft 429*c* of the gearbox 42*c* in a transmission way. Preferably, a steering gear unit 43*c* is provided between the output shaft 429*c* and the rotary member 74*c* for changing a direction of power transmission, thereby facilitating the arrangement of the gearbox 42*c*.

The steering gear unit 43*c* may be consisted of two bevel gears, achieving a change of 90 degrees in the direction of power transmission. As shown in FIG. 16, the gearbox 42*c* is arranged with the output shaft 429*c* thereof extending along the X-direction, while an output shaft 431*c* of the steering gear unit 43*c* extends along the Z-direction. In other embodiments, the output shaft 431*c* of the steering gear unit 43*c* may be inclined to the output shaft 429*c* of the gearbox 42*c*. In other embodiments, the rotary member 74*c* may be connected to the output shaft 429*c* of the gearbox 42*c* directly, thereby omitting the steering gear unit 43*c*.

The fixed member 72*c* is fixedly mounted in the shell 20*c*, a first sliding groove 721*c* which extends along the Z-direction is defined in the fixed member 72*c*. The rotary member 74*c* is rotatably mounted inside the shell 20*c*, a second sliding groove 741*c* which extends spirally in the circumferential direction is defined in the rotary member 74*c*. The sliding member 76*c* cooperates with the first sliding groove 721*c* and second sliding groove 741*c* simultaneously, converting the rotation of the rotary member 74*c* into reciprocating linear motion of the sliding member 76*c* in the Z-direction.

In this embodiment, a mounting seat 78*c* is provided inside the shell 20*c*, particularly inside an inner shell 201*c*, for accommodating the steering gear unit 43*c*, the fixed member 72*c*, the rotary member 74*c*, and the sliding member 76*c* therein. Two latching holes 781*c* are defined in the mounting seat 78*c*, and two latching tabs 723*c* extend radially and outwards from the fixed member 72*c* and engage into the latching holes 781*c*, respectively, thereby fixedly connecting the fixed member 72*c* into the mounting seat 78*c*. In other embodiments, the latching tabs may be provided on the mounting seat 78*c*, and the latching holes may be defined in the fixed member 72*c*.

The fixed member 72*c* is hollow, cylindrical-shaped, the rotary member 74*c* is configured as a rotary shaft and rotatably mounted inside the fixed member 72*c*, and the sliding member 76*c* is configured as a hollow sleeve and slidably mounted around the fixed member 72*c*. In this embodiment, the output shaft 431*c* of the steering gear unit 43*c* extends into the fixed member 72*c* to connect an end (such as a bottom end) of the rotary member 74*c*. The rotary member 74*c* and the output shaft 431*c* may be fixed in the circumferential direction by shape-fitting, snap-fitting, and etc. During operation, the rotary member 74*c* is driven to rotate along with the output shaft 431*c* about a rotary axis extending along the Z-direction.

Figure 12:
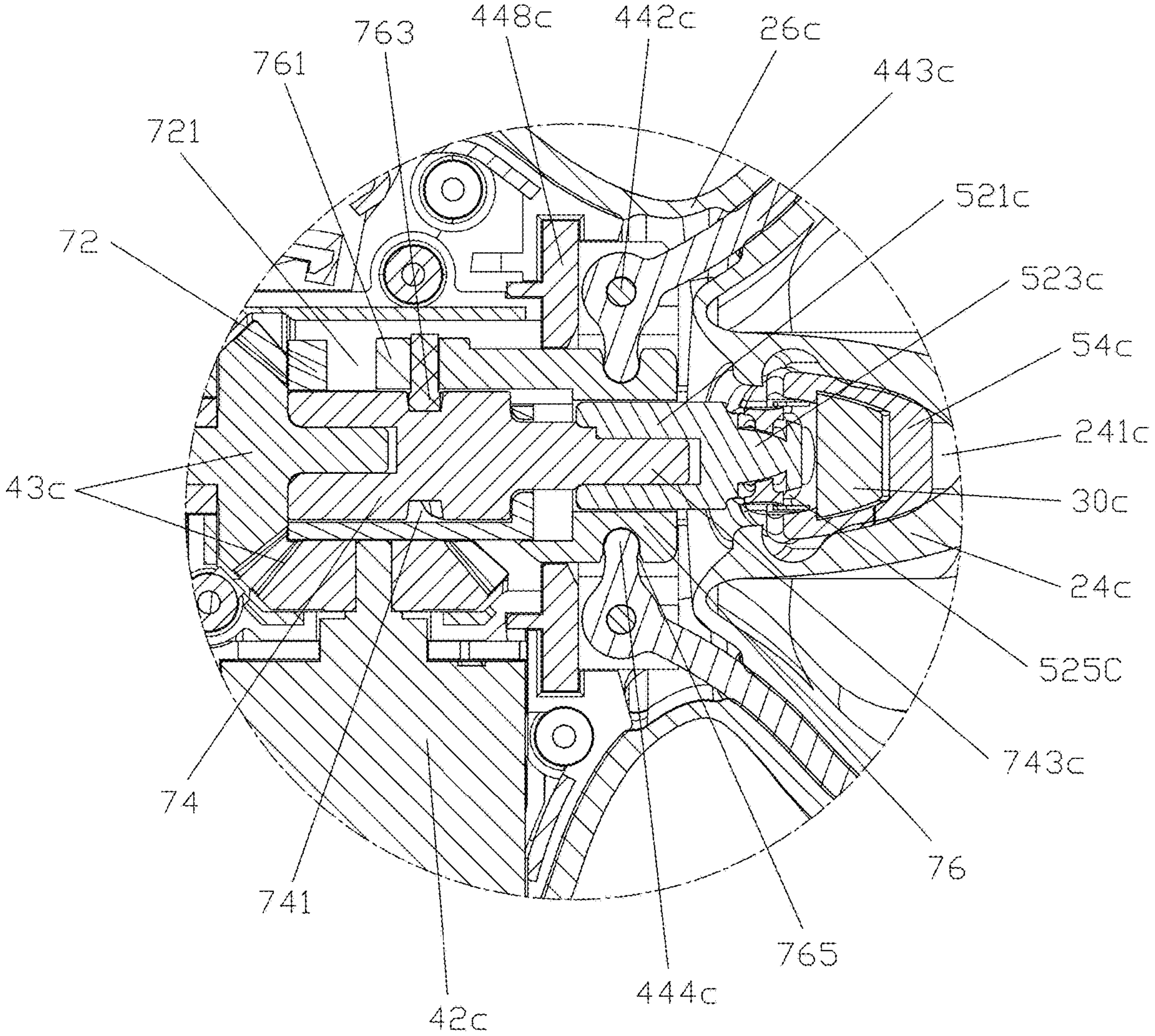
FIG. 12 is an enlarged view of a circle XII of FIG. 11.
Figure 13:
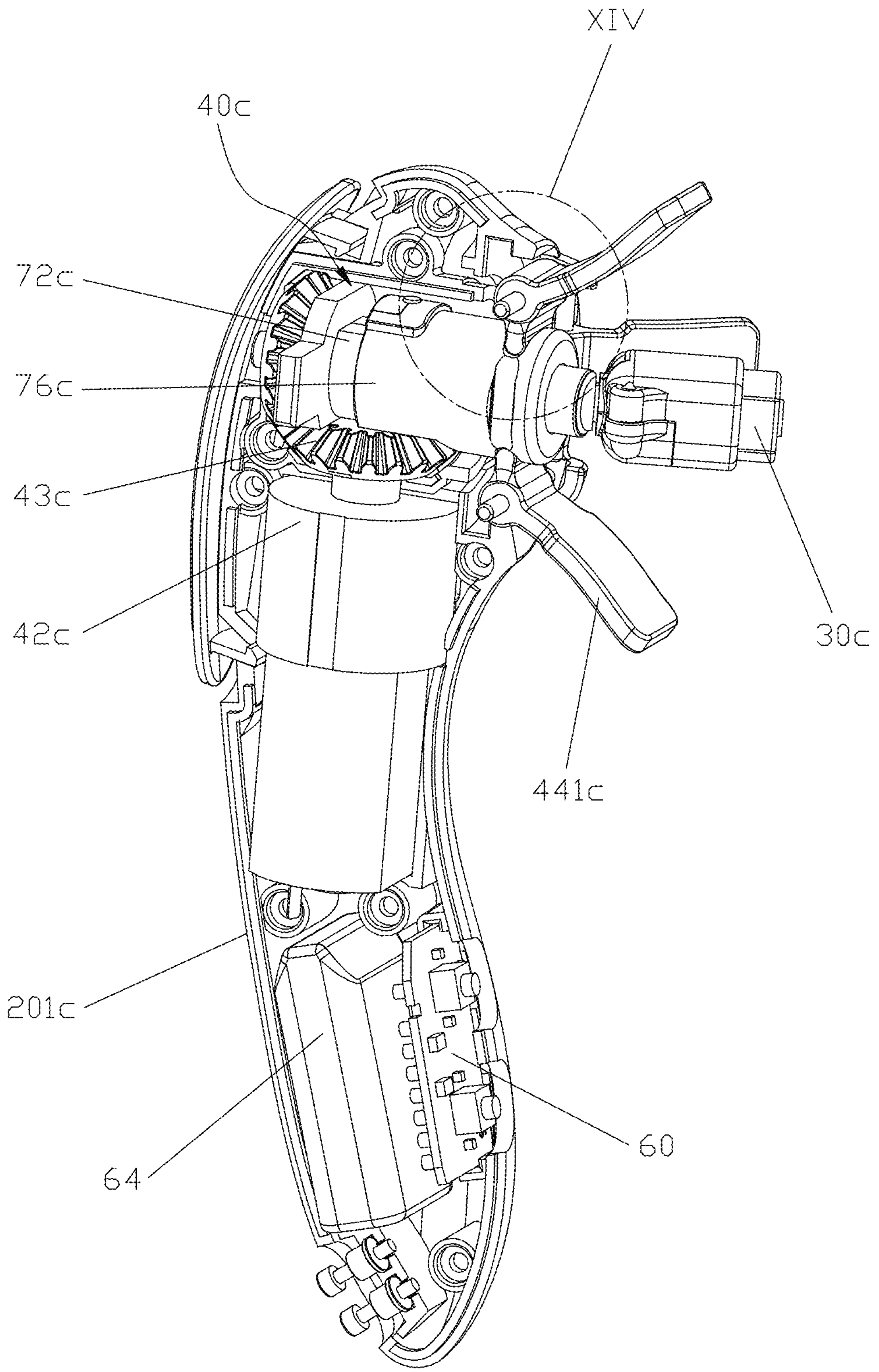
FIG. 13 is a schematic view of the massage device of FIG. 9, wherein an outer shell and a half of an inner shell are removed to show a stimulation assembly inside the shell.
Figure 18:
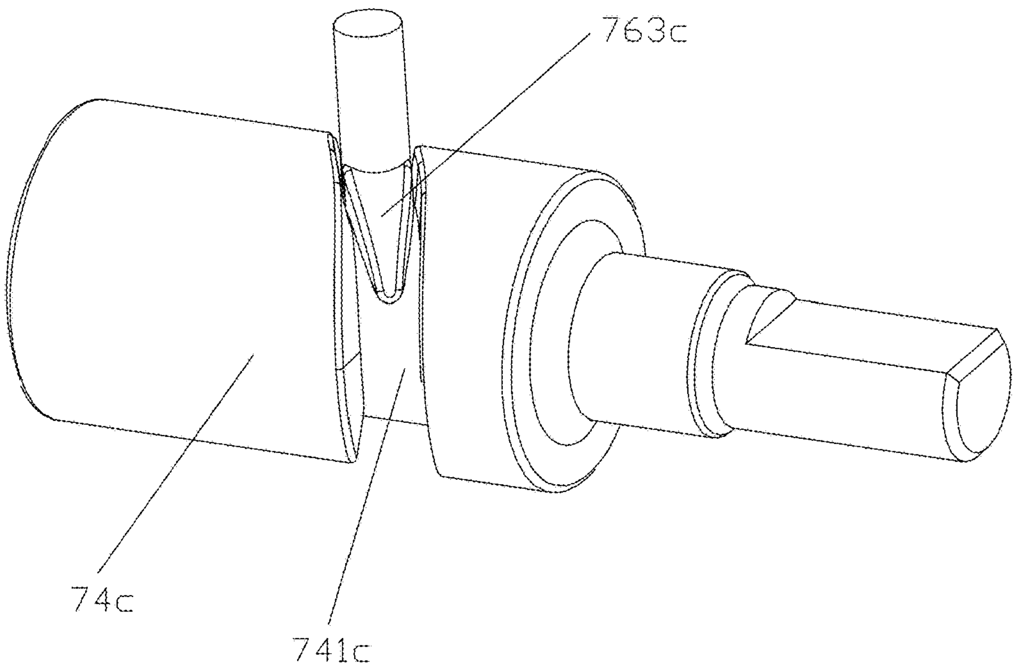
FIG. 18 is an assembled view of a rotary member and a sliding member of the stimulation assembly of FIG. 15.
Figure 19:
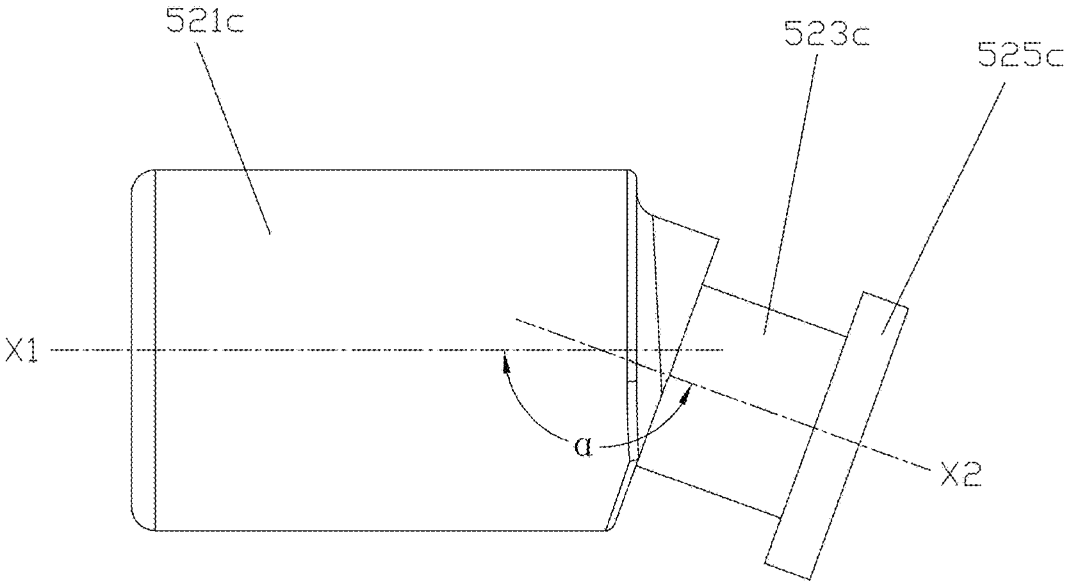
FIG. 19 is a side view of a driving rod of the stimulation assembly of FIG. 15
Figure 20:
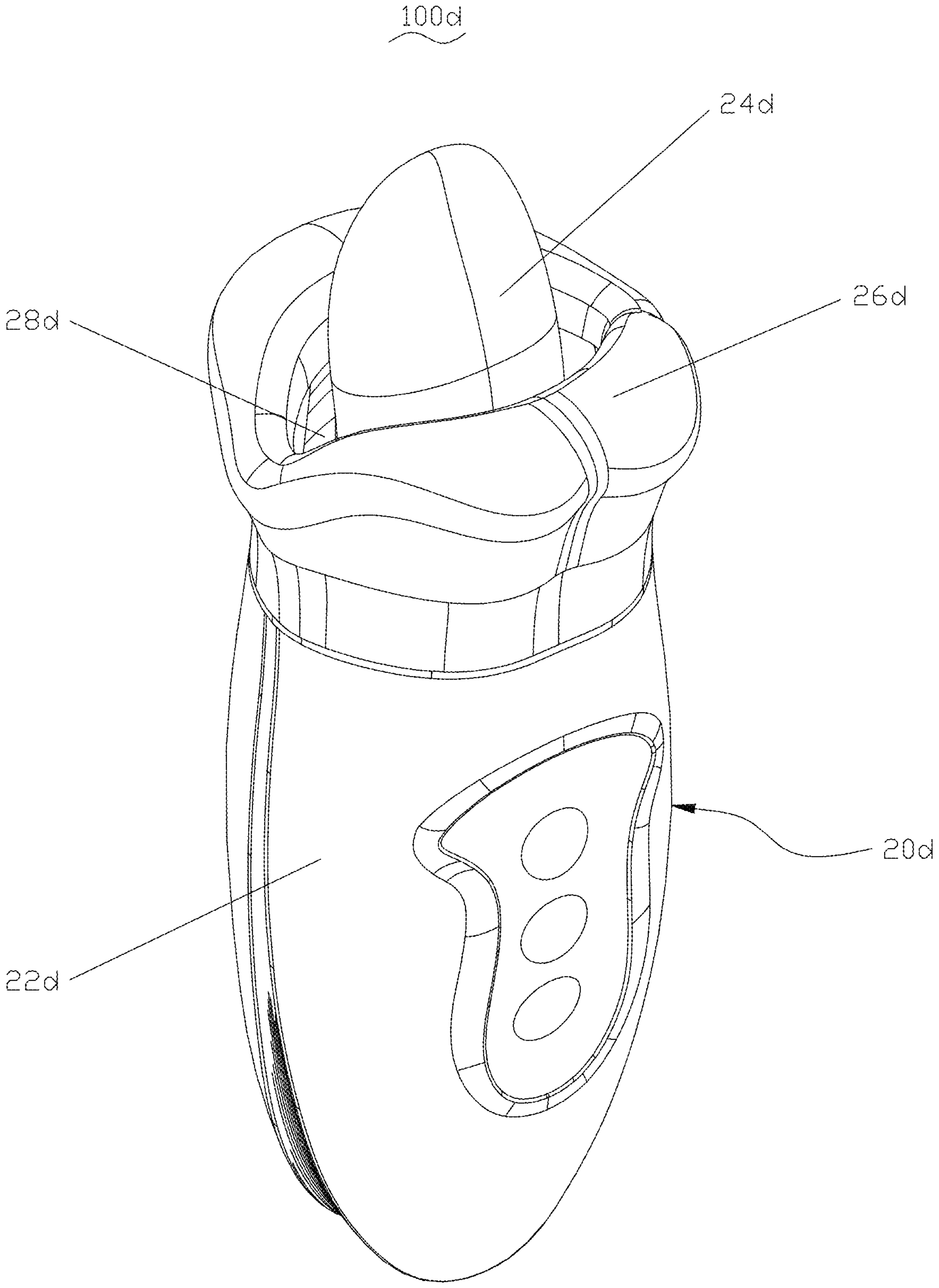
FIG. 20 is an isometric, assembled view of a massage device according to a fourth embodiment of the present application.

Referring to FIG. 12, FIG. 17 and FIG. 18, a first sliding portion 761*c* protrudes inwardly and radially from the sliding member 76*c*, being slidably engaged into the first sliding groove 721*c*, and a second sliding portion 763*c* protrudes inwardly and radially from the first sliding portion 761*c*, being slidably engaged into the second sliding groove 741*c*. The first sliding groove 721*c* extends through a circumferential wall of the fixed member 72*c* in the radial direction, so that the second sliding portion 763*c* can extend through the first sliding groove 721*c* into the second sliding groove 741*c*. Preferably, the second sliding groove 741*c* is axisymmetric about the rotary axis of the rotary member 74*c*.

During operation, the rotary member 74*c* is driven to rotate about its rotary axis (i.e., a central axis of the rotary member 74*c*), the second sliding portion 763*c* engaged in the second sliding groove 741*c* of the rotary member 74*c* makes the sliding member 76*c* has a tendency to rotate about the rotary axis. However, the first sliding portion 761*c* engaged in the first sliding groove 721*c* of the fixed member 72*c* makes the sliding member 76*c* can not rotate. Therefore, the first sliding portion 761*c* slides along the first sliding groove 721*c* and the second sliding portion 763*c* slides along the second sliding groove 741*c*, making the sliding member 76*c* move up and down in the Z-direction.

In this embodiment, the first sliding portion 761*c* and the second sliding portion 763*c* are formed separately and then assembled onto the sliding member 76*c*, facilitating assembly of the fixed member 72*c*, the rotary member 74*c*, and the sliding member 76*c*. In other embodiments, the first sliding portion 761*c* and/or second sliding portion 763*c* may be integrally formed with the sliding member 76*c*, and, the first sliding portion 761*c* and second sliding portion 763*c* may be integrally formed as one piece.

The swinging unit 44*c* includes a plurality of swinging bars 441*c* being rotatably connected to a fixed frame 448*c* by a plurality of first pivots 442*c*, respectively, wherein the fixed frame 448*c* is fixed inside an inner shell 201*c*. In this embodiment, the swinging bar 441*c* is generally sheet-like and elongated. One end of the swinging bar 441*c*, preferably an end away from the first pivot 442*c*, is configured as a swinging end 443*c* and extends into one of the second massage portions 26*c* of the shell 20*c*; and, another end of the swinging bar 441*c*, preferably an end adjacent to the first pivot 442*c*, is configured as a connecting end 444*c* for connecting the sliding member 76*c*.

Figure 14:
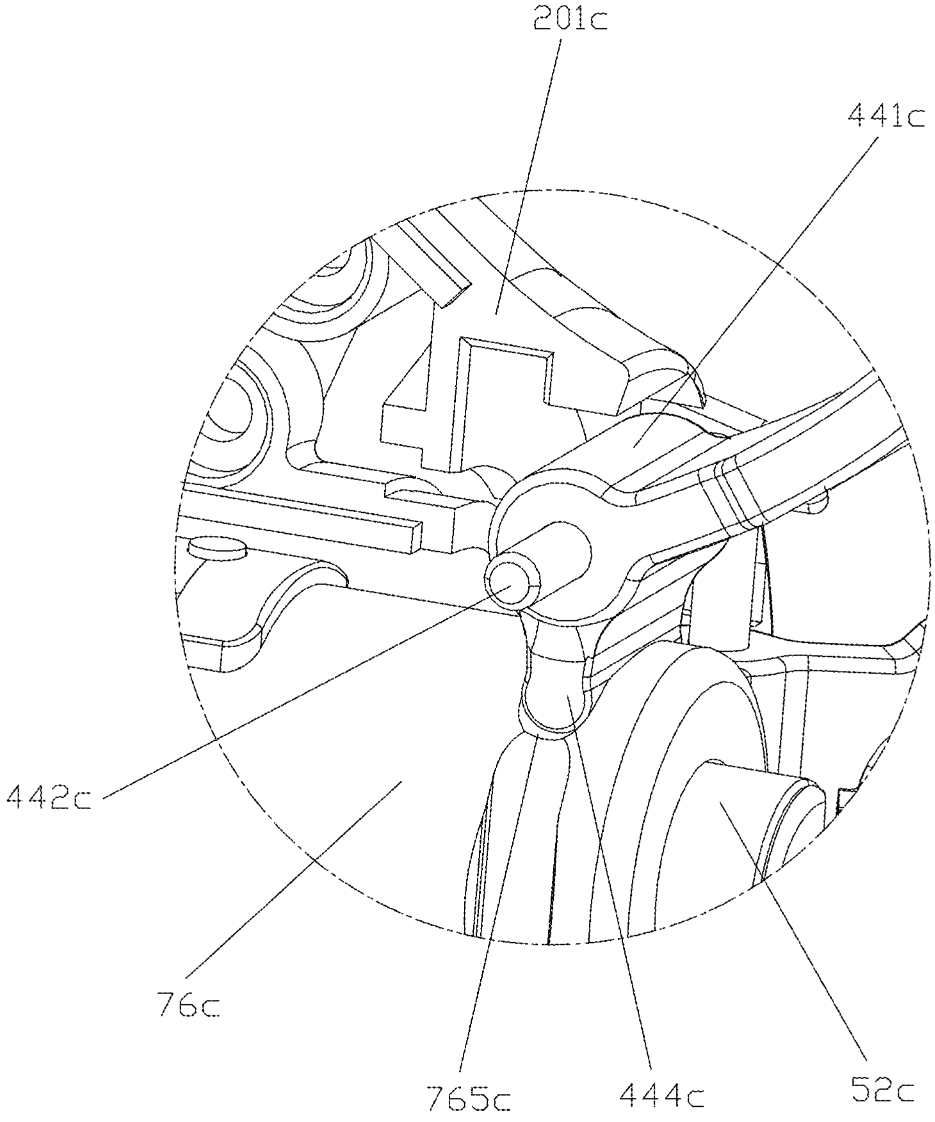
FIG. 14 is an enlarged view of a circle XIV of FIG. 13

In this embodiment, an aperture 449*c* is defined in a central portion of the fixed frame 448*c*, the first and second sliding portions 761*c*, 763*c* is provided at an end (such as a bottom end) of the sliding member 76*c*, and another end (such as a top end) of the sliding member 76*c* extends into the aperture 449*c* of the fixed frame 448*c*. Referring also to FIG. 14, a plurality of straight grooves 765*c* is defined in an outer circumferential wall of the top end of the sliding member 76*c*, and the connecting ends 444*c* of the swinging bars 441*c* are rotatably engaged into the straight grooves 765*c*, respectively.

During operation, the sliding member 76*c* is driven to move in the Z-direction by the gearbox 42*c*, which in turn drives the connecting ends 444*c* of the swinging bars 441*c* to move in the Z-direction simultaneously, the connecting end 444*c* thus rotates in the straight groove 765*c* and accordingly the whole swinging bar 441*c* rotates about the first pivots 442, finally making the swinging ends 443*c* and the second massage portions 26*c* with the swinging ends 443*c* inserted therein swing towards or away from each other, so as to knead the human body in the chamber 28*c*, which is similar to a pinch motion of the human hand, providing a more comfortable sexual stimulation.

Referring to FIGS. 16-17, the third stimulation module 50*c* includes a driving rod 52*c*, a rotary component 54*c*, and a driving component such as a rotary motor, a gearbox and the like.

The driving rod 52*c* includes a first end portion 521*c* with a first central axis X1 and a second end portion 523*c* with a second central axis X2. The first central axis X1 extends along the Z-direction, and the second central axis X2 is inclined relative to the first central axis X1. An angle, preferably, an obtuse angle α, is defined between the first central axis X1 and second central axis X2. The first end portion 521*c* is connected to the driving component in a transmission way, and the second end portion 523*c* is engaged into the rotary component 54*c*. Preferably, a flange 525*c* is formed at a distal end of the second end portion 525*c* for preventing the second end portion 525*c* from detaching from the rotary component 54.

In this embodiment, the rotary component 54*c* is configured as a rigid, hollow structure, and the first stimulation module 30*c* is accommodated inside the rotary component 54*c*. As shown in FIG. 12, the first massage portion 24*c* defines a cavity 241*c* therein, the rotary component 54*c* and the first stimulation module 30*c* are fixed in the cavity 241*c*. Preferably, a central axis of the first massage portion 24*c* is collinear with the second central axis X2 of the second end portion 523*c* and inclined to the first central axis X1 of the first end portion 521*c*. During operation, the first end portion 521*c* of the driving rod 52*c* is driven to rotate about the first central axis X1, and the second end portion 523*c* of the driving rod 52*c* thus rotate around the first central axis X1, which in turn drives the first massage portion 24*c* and the vibration motor 30 to rotate around the first central axis X1.

Referring to FIG. 12 and FIG. 16, the first end portion 521*c* of the driving rod 52*c* is connected to the output shaft 429*c* of the gearbox 42*c* through the rotary member 74*c*. That is, the gearbox 42*c* further serves as the driving component of the third stimulation module 50*c*. Specifically, the first end portion 521*c* of the driving rod 52*c* extends into the sliding member 76*c*, and defines an axial hole 527*c* therein. A connecting rod 743*c* extends from another end (such as a top end) of the rotary member 74*c*, through the fixed member 72*c* and into the sliding member 76*c*. The connecting rod 743*c* is inserted into the axial hole 527*c*, so as to connect the driving rod 52*c* to the rotary member 74*c*.

In other embodiment, the driving rod 52*c* may be connected to the output shaft 429*c* of the gearbox 42*c* in other ways, such as by a shaft coupling device; or, the driving rod 52*c* may be connected to the output shaft 429*c* of the gearbox 42*c* directly. In other embodiments, another gearbox may be provided to drive the driving rod 52*c* to rotate, so that rotation of the first massage portion 24*c* may be controlled separately. The first massage portion 24*c* of this embodiment can not only stimulate the breasts through high-frequency vibration caused by the first stimulation module 30*c*, but also knead the breasts through rotation caused by the third stimulation module 50*c*, further enhancing its stimulation effect.

In other embodiments, as shown in FIG. 11, another vibration motor 27*c* may be provided inside one, or some or all of the second massage portion 26*c* for further improving the stimulation effect of the second massage portions 26*c*. Preferably, the vibration motor 27*c* is provided at a position adjacent to the outer end of the second massage portion 26*c*, preferably adjacent to the swinging end 443*c* of the swinging bars 441*c*, so that the vibration can be transferred to the human body more efficiently.

FIGS. 20-23 show a massage device according to a fourth embodiment of the present application. In this embodiment, the massage device 100*d* includes a shell 20*d* and a stimulation assembly mounted in the shell 20*d*.

The shell 20*d* includes a main portion 22*d*, a first massage portion 24*d* and two second massage portions 26*d*. The first massage portion 24*d* is configured as a tongue, and the second massage portions 26*d* are arranged at two opposite sides of the first massage portion 24*d*. A chamber 28*d* is defined between the second massage portions 26*d*, and the first massage portion 24*d* extends partly beyond the chamber 28*d*. In this embodiment, the two second massage portions 26*d* are connected with each other in a circumferential direction, and in whole are configured as a mouth. Preferably, connecting positions of the two second massage portions 26*d* are generally V-shaped.

Figure 22:
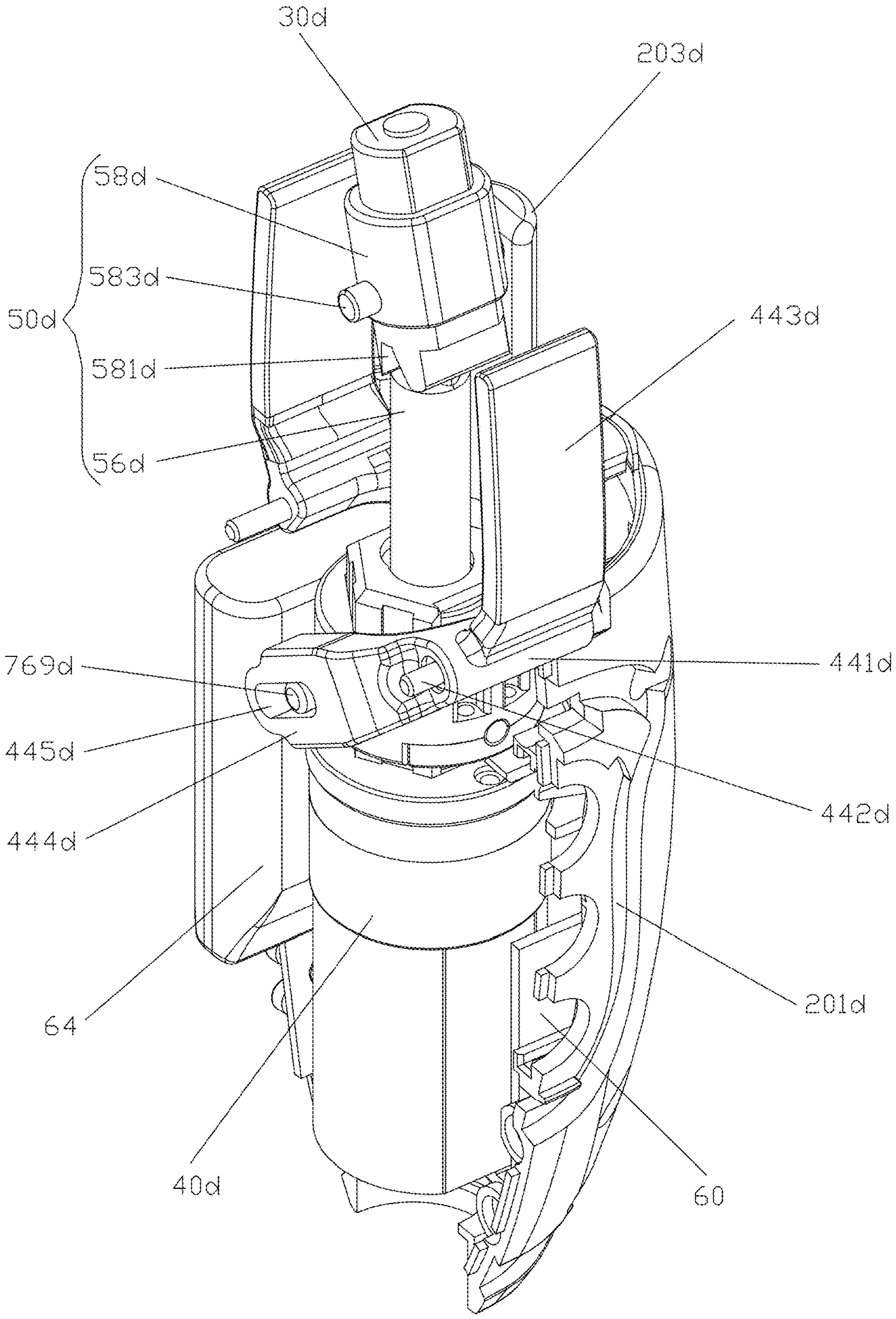
FIG. 22 is a schematic view of the massage device of FIG. 20, wherein an outer shell and a half of an inner shell are removed to show a stimulation assembly inside the shell.

As shown in FIG. 22, in this embodiment, the stimulation assembly includes a first stimulation module 30*d*, such as a vibration motor provided inside the first massage portion 24*d* of the shell 20*d* for driving the first massage portion 24*d* to vibrate; a second stimulation module 40*d* for driving the second massage portions 26*d* to swing towards or away from the first massage portion 24*d*; and a third stimulation module 50*d* for driving the first massage portion 24*d* to swing.

Figure 23:
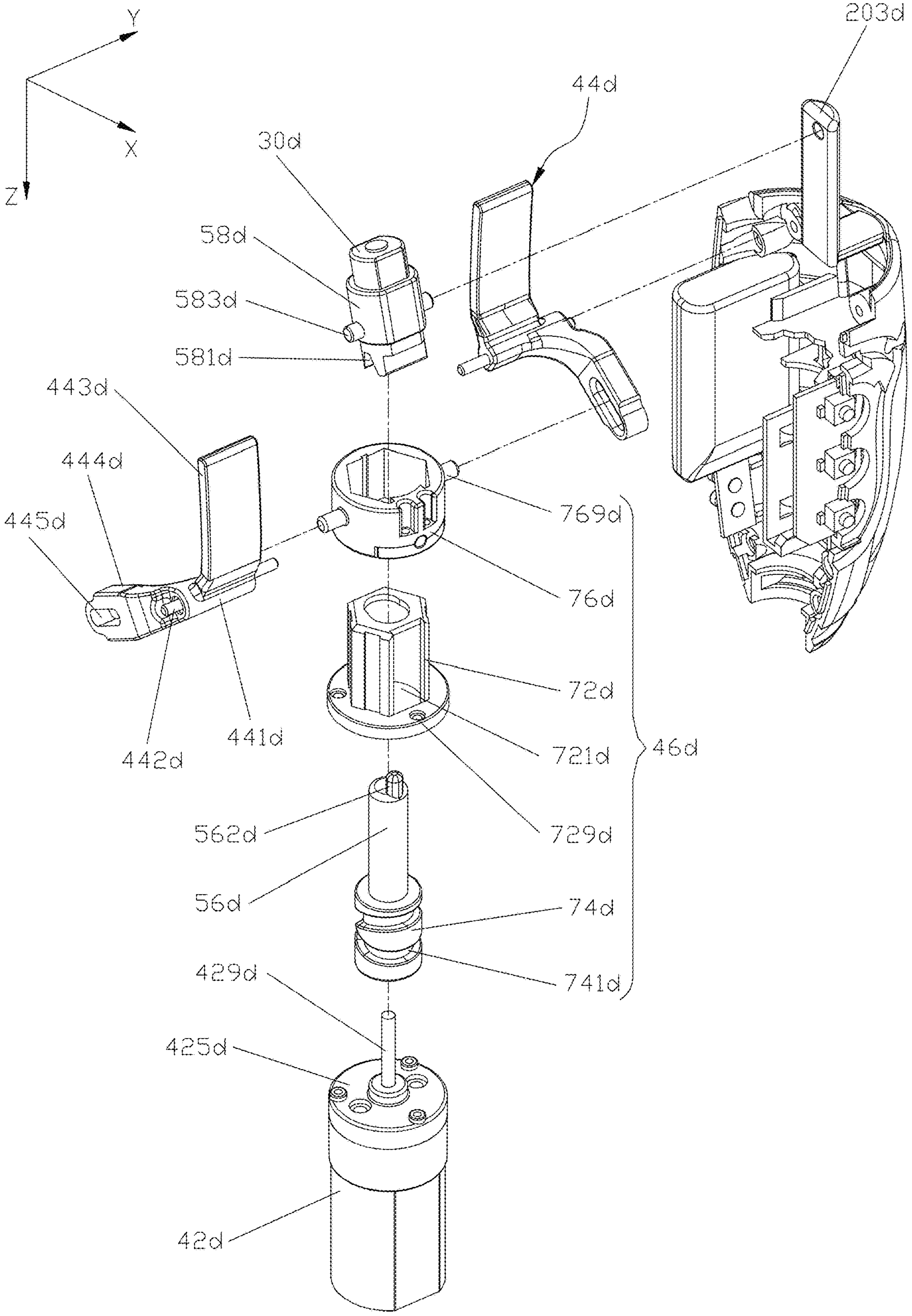
FIG. 23 is an exploded view of FIG. 22.

As shown in FIG. 23, the second stimulation module 40*d* includes a gearbox 42*d*, a swinging unit 44*d*, and a transmission unit 46*d* connected between the gearbox 42*d* and the swinging unit 44*d* for converting rotation of the gearbox 42*d* into reciprocating linear movement.

Figure 21:
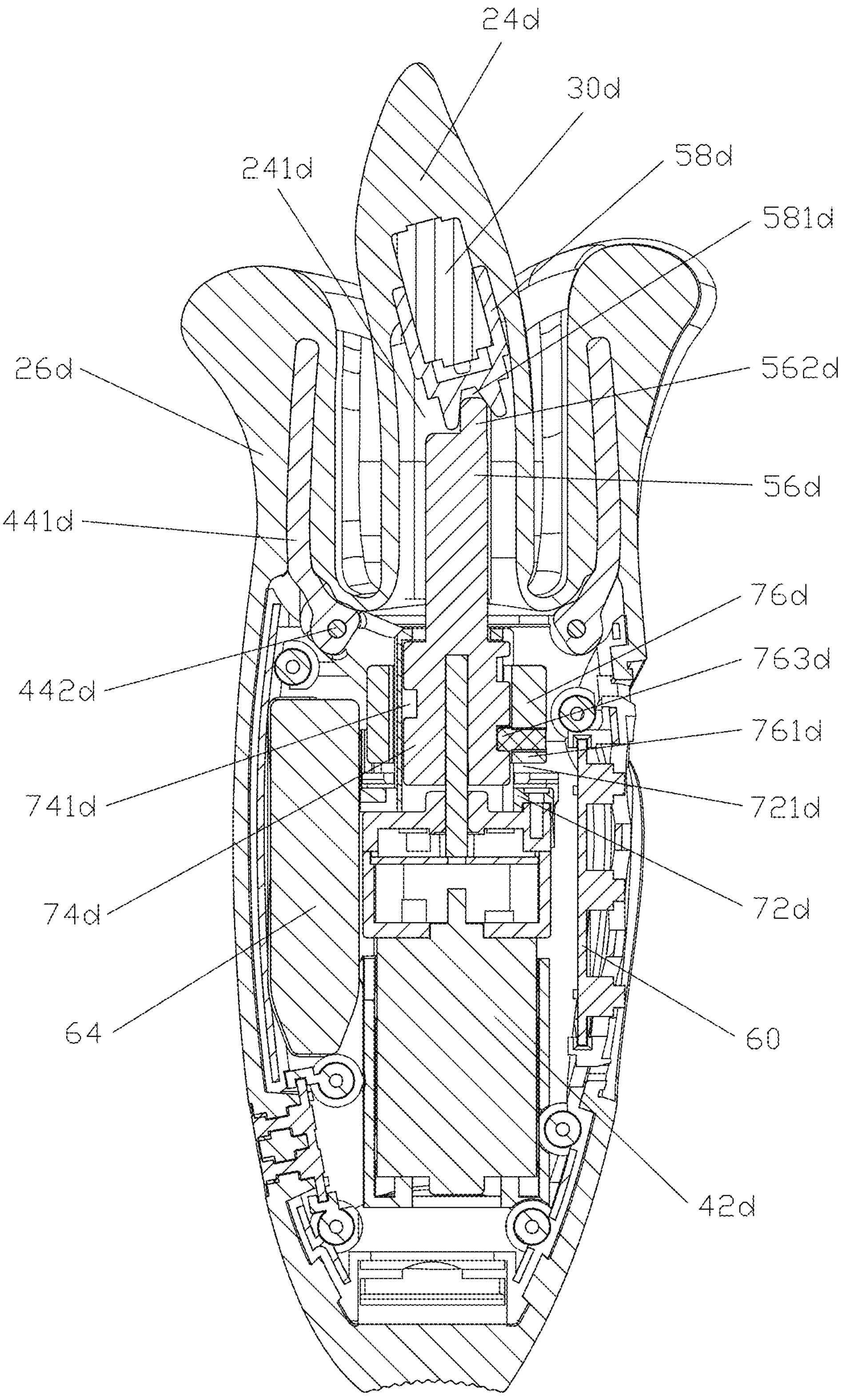
FIG. 21 is a cross-sectional view of the massage device of FIG. 20.

The transmission unit 46*d* includes a fixed member 72*d* defining a first sliding groove 721*d* therein, a rotary member 74*d* defining a second sliding groove 741*d* therein, and a sliding member 76*d* with a first sliding portion 761*d* being slidably engaged into the first sliding groove 721*d* and a second sliding portion 763*d* being slidably engaged into the second sliding groove 741*d* (referring to FIG. 21). The first sliding groove 721*d* of the fixed member 72*d* is elongated in the Z-direction, and the second sliding groove 741*d* of the rotary member 74*d* extends spirally in the circumferential direction.

In this embodiment, through holes 729*d* are defined at an end (such as a bottom end) of the fixed member 72*d*, and fixing members, such as screws, extend through the through holes 729*d* to fix the fixed member 72*d* in the shell 20*d*, such as fix to a gear housing 425*d* of the gearbox 42*d*. The rotary member 74*d* is configured as a rotary shaft, being rotatably mounted in the fixed member 72*d* and connected to an output shaft 429*d* of the gearbox 42*d* in a transmission way. The sliding member 76*d* is configured as a hollow sleeve, and mounted around the fixed member 72*d*. Two connecting rods 769*d* extend radially and outwardly from the sliding member 76*d*.

The swinging unit 44*d* includes two swinging bars 441*d* arranged at two opposite sides of the sliding member 76*d*, respectively. Each swinging bar 441*d* is rotatably connected to the shell 20*d*, particularly an inner shell 201*d*, by a first pivot 442*d*, wherein the first pivot 442*d* is parallel to the connecting rod 769*d*. An end of the swinging bar 441*d* away from the first pivot 442*d* is configured as a swinging end 443*d* and extends into one of the second massage portions 26*d* of the shell 20*d*; and, another end of the swinging bar 441*d* adjacent to the first pivot 442*d* is configured as a connecting end 444*d* for connecting the sliding member 76*d*.

In this embodiment, the connecting end 444*d* of each swinging bar 441*d* defines an elongated slot 445*d* therein. Each connecting rod 769*d* is movably and rotataly engaged into the elongated slot 445*d* of one corresponding swinging bar 441*d*, thereby the sliding member 76*d* can drive the connecting ends 444*d* of the swinging bars 441*d* to do reciprocating movement in the Z-direction synchronously, which in turn drives the swinging bars 441*d* to rotate about the corresponding first pivots 442*d* in opposite directions, respectively; and finally drives the swinging ends 443*d* and the second massage portions 26*d* to swing towards or away from the first massage portion 24*d*.

As shown in FIG. 23, the third stimulation module 50*d* includes a driving rod 56*d*, a swinging component 58*d* and a driving component such as a rotary motor, a gearbox and the like. The driving rod 56*d* is connected to the driving component in a transmission way, and is driven to rotate about a rotary axis which extends along the Z-direction. An eccentric rod 562*d* is set eccentrically on the driving rod 56*d* and extends towards the swinging component 58*d*. The swinging component 58*d* defines an elongated groove 581*d* for receiving the eccentric rod 562*d*, wherein the elongated groove 581*d* extends in a direction (such as the Y-direction) perpendicular to the rotary axis of the driving rod 56*d*.

The swinging component 58*d* is rotatably connected to the shell 20*d* by a third pivot 583*d*, wherein the third pivot 583*d* extends along the Y-direction, parallel to and spaced from the elongated groove 581*d*. During operation, the eccentric rod 562*d* is driven to revolve round the rotary axis of the driving rod 56*d*, its displacement in the Y-direction makes it slide relative to the swinging component 58*d* along the elongated groove 581*d*, while its displacement in the X-direction drives the swinging component 58*d* to move along with it in the X-direction, thereby making the swinging component 58*d* and the first massage portion 24*d* swing about the third pivot 583*d* in the XZ-plane.

As shown in FIG. 21, the first massage portion 24*d* defines a cavity 241*d* for receiving the swinging component 58*d* therein. Preferably, two support arms 203*d* extend from the inner shell 201*d* into the cavity 241*d* for support two ends of the third pivot 583*d*, respectively. Preferably, the swinging component 58*d* has an upper portion being embedded inside the first massage portion 24*d*, and a lower portion on which third pivot 583*d* and the elongated groove 581*d* are provided accommodated in the cavity 241*d*. The driving rod 56*d* extends into the cavity 241*d*, and the eccentric rod 562*d* is slidably inserted in the elongated groove 581*d* of the swinging component 58*d*.

Preferably, the swinging component 58*d* is made of hard materials, and the first stimulation module 30*d* is mounted in the swinging component 58*d*, and thus can swing together with the swinging component 58*d* and the first massage portion 24*d*. Therefore, the first massage portion 24*d* can not only stimulate the human body through high-frequency vibration caused by the first stimulation module 30*d*, but also knead the human body through swinging caused by the third stimulation module 50*d*, further enhancing the stimulation effect of the first massage portion 24*d*.

In this embodiment, the driving rod 56*d* is integrally formed on a top end of the rotary member 74*d*, and the gearbox 42*d* further serves as the driving component of the third stimulation module 50*d*. In other embodiments, the driving rod 56*d* may be formed separately and then connected to the gearbox 42*d* directly or indirectly. In other embodiments, another gearbox may be provided to drive the driving rod 56*d* to rotate, thereby the swinging motion of the first massage portion 24*d* can be controlled separately.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A massage device comprising:

a shell comprising a main body, a first massage portion extending from the main body, and at least two second massage portions arranged around the first massage portion;

a first stimulation module mounted in the shell and configured for driving the first massage portion to rotate; and a second stimulation module mounted in the shell and configured for driving the at least two second massage portions to swing towards or away from the first massage portion;

wherein the first stimulation module comprises a driving component and a driving rod connected to the driving component in a transmission way, and wherein the driving rod comprises a first end portion with a first central axis and a second end portion with a second central axis being inclined to the first central axis, the first end portion is connected to the driving component in a transmission way, and the second end portion extends into the first massage portion, thereby driving the first massage portion to rotate around the first central axis during use.

2. The massage device according to claim 1, further comprising a vibration motor mounted inside the first massage portion.

3. The massage device according to claim 1, further comprising a vibration motor mounted inside the at least two second massage portions.

4. The massage device according to claim 1, wherein the first stimulation module further comprises a rotary component fixed in the first massage portion, and a flange is provided at a distal end of the second end portion and engaged into the rotary component.

5. The massage device according to claim 1, wherein the second stimulation module comprises a swinging unit and a transmission unit connected between the driving component and the swinging unit, the swinging unit comprises at least two swinging bars, and each of the at least two swinging bars comprises a swinging end extending into one of the at least two second massage portions and a connecting end being connected to the transmission unit.

6. The massage device according to claim 5, wherein the transmission unit comprises a fixed member defining a first sliding groove therein, a rotary member defining a second sliding groove therein, and a sliding member with a first sliding portion engaged into the first sliding groove and a second sliding portion engaged into the second sliding groove, and the driving rod is connected to the driving component through the rotary member.

7. The massage device according to claim 6, wherein the sliding member defines at least two grooves therein, and the connecting end of each of the at least two swinging bars is rotatably engaged into one of the at least two grooves.

8. The massage device according to claim 6, wherein the driving component is configured to drive the rotary member to rotate about a rotary axis extending along a first direction, the second sliding groove extends spirally along a circumferential direction of the rotary member, and the first sliding groove extends along the first direction.

9. The massage device according to claim 8, wherein the rotary member is rotatably mounted in the fixed member, and the sliding member is slidably mounted around the fixed member.

10. A massage device comprising:

a shell comprising a main body, a first massage portion extending from the main body, and at least two second massage portions arranged around the first massage portion;

a first stimulation module mounted in the shell and configured for driving the first massage portion to rotate or swing; and a second stimulation module mounted in the shell and configured for driving the at least two second massage portions to swing towards or away from the first massage portion;

wherein the first stimulation module comprises a driving component and a driving rod connected to the driving component in a transmission way, and the driving rod extends partly into the first massage portion to drive the first massage portion to rotate or swing;

wherein the second stimulation module comprises a swinging unit and a transmission unit connected between the driving component and the swinging unit, the swinging unit comprises at least two swinging bars, and each of the at least two swinging bars comprises a swinging end extending into one of the at least two second massage portions and a connecting end being connected to the transmission unit; and wherein the transmission unit comprises a fixed member defining a first sliding groove therein, a rotary member defining a second sliding groove therein, and a sliding member with a first sliding portion engaged into the first sliding groove and a second sliding portion engaged into the second sliding groove, and the driving rod is connected to the driving component through the rotary member.

11. The massage device according to claim 10, wherein the sliding member defines at least two grooves therein, and the connecting end of each of the at least two swinging bars is rotatably engaged into one of the at least two grooves.

12. The massage device according to claim 10, wherein the connecting end of each of the at least two swinging bars defines a slot therein, at least two connecting rods extend outwards from the sliding member, and each of the at least two connecting rods is rotatably engaged into the slot of the connecting end of one of the at least two swinging bars.

13. The massage device according to claim 10, wherein the driving rod is integrally formed with the rotary member.

14. The massage device according to claim 10, wherein the driving component is configured to drive the rotary member to rotate about a rotary axis extending along a first direction, the second sliding groove extends spirally along a circumferential direction of the rotary member, and the first sliding groove extends along the first direction.

15. A massage device, comprising:

a shell comprising a first flexible massage portion and at least two second flexible massage portions being arranged around the first flexible massage portion;

a vibration motor accommodated inside the first flexible massage portion;

a first stimulation module comprising a driving component mounted inside the shell and a driving rod connected to the driving component in a transmission way, wherein an end portion of the driving rod extends into the first flexible massage portion to drive the first flexible massage portion and the vibration motor to rotate; and a second stimulation module mounted in the shell and configured for driving the at least two second flexible massage portions to swing towards or away from the first flexible massage portion, wherein a rigid rotary component is fixed inside the first flexible massage portion, and a flange extends radially from a distal end of the end portion of the driving rod and engages into the rigid rotary component.

16. The massage device according to claim 15, wherein the shell is elongated, and a rotary axis of the driving rod is substantially perpendicular to a longitudinal direction of the shell.

17. The massage device according to claim 15, wherein the at least two second flexible massage portions comprise at least three second flexible massage portions arranged around the first flexible massage portion.

* * * * *